United States Patent
Ghosh et al.

(10) Patent No.: US 8,572,574 B2
(45) Date of Patent: Oct. 29, 2013

(54) SOLVING HYBRID CONSTRAINTS TO VALIDATE SPECIFICATION REQUIREMENTS OF A SOFTWARE MODULE

(75) Inventors: Indradeep Ghosh, San Jose, CA (US); Daryl R. Shannon, Houston, TX (US)

(73) Assignee: Fujitsu Limited, Kawasaki-shi (JP)

( * ) Notice: Subject to any disclaimer, the term of this patent is extended or adjusted under 35 U.S.C. 154(b) by 454 days.

(21) Appl. No.: 12/837,818

(22) Filed: Jul. 16, 2010

(65) Prior Publication Data

US 2012/0017117 A1 Jan. 19, 2012

(51) Int. Cl.
*G06F 9/44* (2006.01)

(52) U.S. Cl.
USPC .................... 717/126; 717/120; 717/125

(58) Field of Classification Search
USPC .................... 717/114–116, 120–127
See application file for complete search history.

(56) References Cited

U.S. PATENT DOCUMENTS

| | | | |
|---|---|---|---|
| 5,991,537 A * | 11/1999 | McKeon et al. | 717/115 |
| 6,175,955 B1 * | 1/2001 | Ojennes et al. | 717/126 |
| 6,289,502 B1 * | 9/2001 | Garland et al. | 717/104 |
| 6,385,769 B1 * | 5/2002 | Lewallen | 717/125 |
| 6,513,155 B1 * | 1/2003 | Alexander et al. | 717/124 |
| 6,662,357 B1 * | 12/2003 | Bowman-Amuah | 717/120 |
| 6,681,383 B1 * | 1/2004 | Pastor et al. | 717/126 |
| 6,785,882 B1 * | 8/2004 | Goiffon et al. | 717/120 |
| 6,880,149 B2 * | 4/2005 | Cronce | 717/126 |
| 6,895,577 B1 * | 5/2005 | Noble et al. | 717/126 |
| 6,996,806 B2 * | 2/2006 | Bates et al. | 717/125 |
| 7,076,764 B2 * | 7/2006 | Kramer | 717/120 |
| 7,117,480 B2 * | 10/2006 | Andersh et al. | 717/120 |
| 7,143,392 B2 * | 11/2006 | Ii et al. | 717/125 |
| 7,150,008 B2 * | 12/2006 | Cwalina et al. | 717/126 |
| 7,168,063 B2 * | 1/2007 | Meijer | 717/116 |
| 7,210,118 B2 * | 4/2007 | Hastings | 717/100 |
| 7,228,527 B1 * | 6/2007 | Phillips et al. | 717/127 |
| 7,305,659 B2 * | 12/2007 | Muller et al. | 717/127 |
| 7,398,469 B2 * | 7/2008 | Kisamore et al. | 715/704 |
| 7,428,726 B1 * | 9/2008 | Cowan et al. | 717/122 |
| 7,451,432 B2 * | 11/2008 | Shukla et al. | 717/106 |
| 7,458,046 B2 | 11/2008 | Ghosh | |
| 7,526,765 B2 * | 4/2009 | Lin et al. | 718/102 |
| 7,571,428 B2 * | 8/2009 | Martin et al. | 717/126 |
| 7,650,594 B2 * | 1/2010 | Nattinger | 717/125 |
| 7,669,188 B2 * | 2/2010 | Nickell et al. | 717/126 |

(Continued)

OTHER PUBLICATIONS

Huang et al, "Optimal allocation of testing resources for modular software systems", IEEE ISSRE, pp. 1-10, 2002.*

(Continued)

*Primary Examiner* — Anil Khatri
(74) *Attorney, Agent, or Firm* — Baker Botts L.L.P.

(57) ABSTRACT

In one embodiment, a software module is validated according to requirements associated with the software module. The software module has numeric and string variables, and is associated with first numeric constrains and first string constraints. Second numeric constraints applying to specific numeric variables and second string constraints applying to specific string variables are inferred. Each numeric constraint is represented with an equation, and each string constraint is represented with a finite state machine. Attempt to solve a solution for the numeric and string variables that satisfies all the first and second numeric constraints, all the first and second string constraints, and all the requirements associated with the software module by iteratively testing different possible values for the numeric and string variables.

25 Claims, 11 Drawing Sheets

(56) References Cited

U.S. PATENT DOCUMENTS

| | | | |
|---|---|---|---|
| 7,685,571 B2* | 3/2010 | Schulte et al. | 717/126 |
| 7,788,638 B2* | 8/2010 | Hoberman et al. | 717/120 |
| 7,797,677 B1* | 9/2010 | Ballagh et al. | 717/115 |
| 7,823,126 B2* | 10/2010 | Kim et al. | 717/120 |
| 7,861,226 B1 | 12/2010 | Episkopos et al. | |
| 7,861,227 B2* | 12/2010 | Motoyama et al. | 717/124 |
| 7,870,540 B2* | 1/2011 | Zare et al. | 717/126 |
| 7,886,273 B2* | 2/2011 | Hinchey et al. | 717/124 |
| 8,037,453 B1* | 10/2011 | Zawadzki | 717/123 |
| 8,291,386 B2* | 10/2012 | Daniel | 717/125 |
| 2009/0044271 A1 | 2/2009 | Benameur et al. | |
| 2009/0089759 A1 | 4/2009 | Rajan | |
| 2009/0125976 A1 | 5/2009 | Wassermann et al. | |
| 2010/0125832 A1 | 5/2010 | Prasad | |
| 2012/0017119 A1 | 1/2012 | Ghosh | |
| 2012/0017200 A1 | 1/2012 | Ghosh | |

OTHER PUBLICATIONS

Hirayama et al, "A selective software testing method based on priorities assigned to functional modules", IEEE, pp. 259-267, 2001.*

Tran et al, "Understanding and managing the relationship between requirement changes and product constraints in component based software projects", IEEE, pp. 132-142, 1998.*

Ratschan et al, "Safety verification of hybrid systems by constraints propogation based abstration refinement", ACM Trans. on Embedded Comput. Sys. vol. 6, No. 1, article 8, pp. 1-23, 2007.*

Boerkoel et al, "Evaluating hybrid constraints tightening for scheduleing agents", ACM, pp. 673-680, 2009.*

Wassermann et al, "Dynamic test input generation for web applications", ACM ISSTA, pp. 249-259, 2008.*

Dreyer et al, "Graphical models over multiple strings", ACM AFNLP, pp. 101-110, 2009.*

Pearson, "Fast hashing of varibale length test strings", ACM, vol. 33, No. 6, pp. 677-680, 1990.*

Li et al, "VGRAM: Improving performance of approximate queries on string collections using variable length grams", ACM VLBD, pp. 303-314, 2007.*

U.S. Appl. No. 12/837,974, filed Jul. 16, 2010.

U.S. Appl. No. 12/838,061, filed Jul. 16, 2010.

Shannon, Daryl et al., "Abstracting Symbolic Execution with String Analysis," Testing: Academic and Industrial Conference Practice and Research Techniques, IEEE, pp. 13-22, Sep. 1, 2007.

Search Report for EP 11174016.3, Nov. 7, 2011.

I. Ghosh, U.S. Appl. No. 12/837,974, Response to Non-final Office Action, Jul. 25, 2012.

I. Ghosh, U.S. Appl. No. 12/838,061, Response to Non-final Office Action, Jul. 30, 2012.

Emmi, Michael, et al., "Dynamic Test Input Generation for Database Applications", ISSTA '07, London, England, United Kingdom, pp. 151-161, Jul. 9-12, 2007.

Tounsi, Mohamed et al., "An Iterative local-search framework for solving constraint satisfaction problem", Applied Soft Computing 8, pp. 1530-1535, 2008.

Fu, Xiang et al., "A String constraint Solver for Detecting Web Application Vulnerability", SEKE 2010, Proceedings of the Twenty-Second International Conference on Software Engineering & Knowledge Engineering, Jul. 1-3, 2010, 35 pages (cover, i-xxvi, and 535-542).

I. Ghosh, U.S. Appl. No. 12/837,974, USPTO Non-final Office Action dated Apr. 25, 2013.

I. Ghosh, U.S. Appl. No. 12/838,061, USPTO Non-final Office Action dated May 3, 2013.

I. Ghosh, U.S. Appl. No. 12/837,974, USPTO Non-final Office Action mailed Apr. 26, 2012.

I. Ghosh, U.S. Appl. No. 12/838,061, USPTO Non-final Office Action mailed May 2, 2012.

van der Linden, P., "Just Java 2," Jun. 21, 2004, 6th Edition, pp. 61-62.

Collavizza et al., "CPBPV: A Constraint-Programming Framework for Bounded Program Verification," 2008, Lecture Notes in Computer Science, vol. 5202/2008, pp. 327-341.

Saxena et al., "A Symbolic Execution Framework for JavaScript," Mar. 8, 2010, Univ. of California at Berkeley, Electrical Engineering and Computer Science Technical Report No. UCB/EECS-2010-26.

Khurshid, Sarfraz et al., "Generalizing Symbolic Execution to Library Classes", Paste '05, ACM 1-59593-239, pp. 103-110, 2005.

Fu, Xiang, et al., "A Static Analysis Framework for Detecting SQL Injection Vulnerabilities", 31st Annual International Computer Software and Applications Conference (COMPSAC 2007), IEEE Computer Society, 8 pages, 2007.

I. Ghosh, U.S. Appl. No. 12/837,974, USPTO, Final Office Action, Oct. 15, 2012.

I. Ghosh, U.S. Appl. No. 12/838,061, USPTO, Final Office Action, Oct. 18, 2012.

Fu, Xiang, et al., "A Static Analysis Framework for Detecting SQL Injection Vulnerabilities", 31st Annual International Computer Software and Applications Conference (COMPSAC 2007), IEEE Computer Society, 8 pages.

I. Ghosh, U.S. Appl. No. 12/838,061, USPTO, Final Office Action, Oct.18, 2012.

I. Ghosh, U.S. Appl. No. 12/837,974, Response to Final Office Action, Nov. 15, 2012.

I. Ghosh, U.S. Appl. No. 12/837,974, USPTO, Advisory Action, Dec. 5, 2012.

Extended European Search Report for European Patent Application 11171589.2, Jan. 24, 2012.

Extended European Search Report for European Patent Application 11171490.3, Jan. 24, 2012.

I. Ghosh, U.S. Appl. No. 12/838,061, Response to Final Office Action, Dec. 19, 2012.

I. Ghosh, U.S. Appl. No. 12/838,061, USPTO, Advisory Action, Jan. 9, 2013.

European Patent Office, Communication Pursuant to Article 94(3) EPC for Application No. 11 174 016.3—1951, 7 pages, Jun. 10, 2013.

Bjørner, Nikolaj, et al., "Path Feasibility Analysis for String-Manipulating Programs", Tools and Algorithms for the Construction and Analysis of Systems: 15th International Conference, TACAS 2009, LNCS 5505, XP019115837, pp. 306-321, Mar. 22-29, 2009.

European Patent Office, Communication Pursuant to Article 94(3) EPC for Application No. 11 174 016.3—1951 7 pages, Jun. 10, 2013.

European Patent Office, Communication Pursuant to Article 94(3) EPC for Application No. 11 171 490.3—1951, 8 pages, Jun. 10, 2013.

European Patent Office, Communication Pursuant to Article 94(3) EPC for Application No. 11 171 589.2—1951, 9 pages, Jun. 10, 2013.

* cited by examiner

US 8,572,574 B2

SOLVING HYBRID CONSTRAINTS TO VALIDATE SPECIFICATION REQUIREMENTS OF A SOFTWARE MODULE

TECHNICAL FIELD

The present disclosure generally relates to testing and validating software modules.

BACKGROUND

A software application may include any number of modules (e.g., classes, functions, procedures, subroutines, or code blocks), and each module may be tested or validated individually. A software module may be tested or validated manually or automatically. In the former case, a person (e.g., a software testing engineer) may manually design test cases for the software module based on the design specification of the module, execute the module under the test cases, and check for module behavior or output that does not agree with the test cases. In the later case, a software testing tool, implemented as computer software or hardware, may automatically generate test cases for a software module under test, execute the module under test while simulating the test cases, and check for module behavior or output that does not agree with the test cases.

DESCRIPTION OF EXAMPLE EMBODIMENTS

Figure 1:
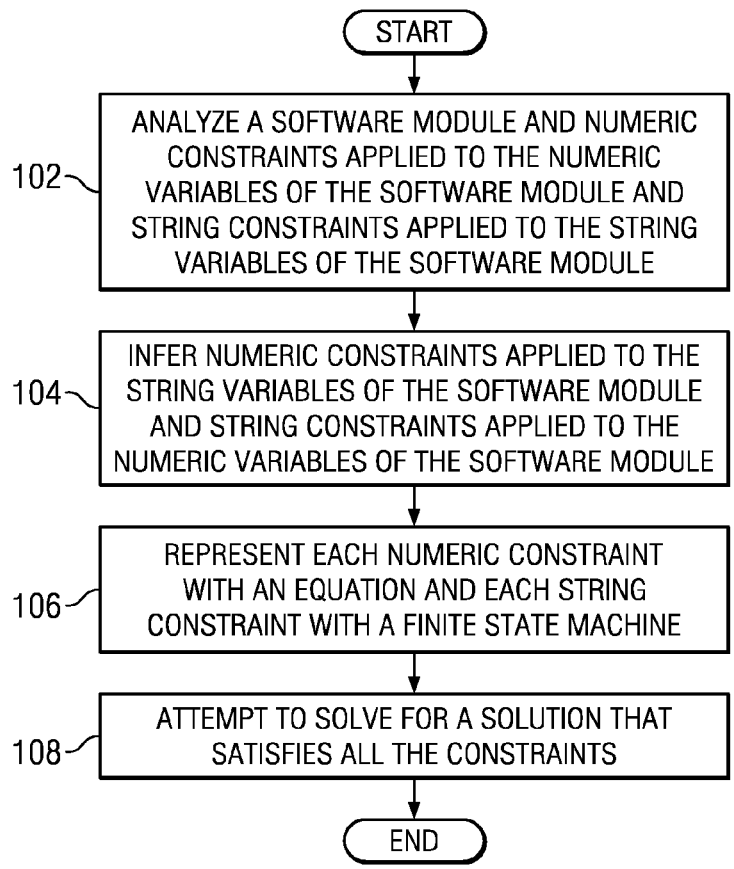
FIG. 1 illustrates an example method for determining and solving constraints placed on a software module or its variables.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A software application is often organized into a number of software modules, and each software module may include code that perform specific functionalities. In a typical scenario, a software module may have any number of input or output variables. When the software module is invoked, actual input values may be passed to the software module (e.g., by the code that invokes the software module) as the values assigned to the input variables of the software module. The code of the software module may be executed in connection with the actual input values. Eventually, actual output values for the output variables of the software module may be determined and returned by the software module, at which point the software module completes its execution. Moreover, the actual output values determined by the code of the software module usually depend on the actual input values passed to the software module upon its invocation. In addition, the software module may have any number of local variables, also referred to as intermediate variables, whose values may also depend, directly or indirectly, on the values of the input variables. A local variable has a local scope. It only exists and is only accessible from within the context of the software module in which the local variable is declared. In contrast, the software application, to which the software module belongs, may have any number of global variables. A global variable has a global scope within the software application itself and is accessible to all the software modules that belong to the software application. When a software module is invoked, it may access or modify the value of a global variable, and the value modification is persistent even after the software module completes its execution.

JAVA® and JAVASCRIPT® are registered trademarks of Oracle America, Inc. MICROSOFT® is a registered trademark of Microsoft Corporation.

In particular embodiments, when the value of a first variable is determined based on the value of a second variable (i.e., the value of the first variable depends on the value of the second variable), the first variable is considered to depend on the second variable. A variable, whether input or output and whether local or global, usually has a specific data type, such as, for example and without limitation, character, string, integer, float, double, Boolean, pointer, array, and enumeration. The data type of a variable indicates what type of data (e.g., actual values) may be assigned to the variable. For example, only integer values should be assigned to a variable whose type is integer; and only true-false values should be assigned to a variable whose type is Boolean. Different programming languages may define different data types that the variables of the software modules or applications written in the specific languages may have, as well as different operations that may be applied to the specific data types. In particular embodiments, the data types of a programming language may be divided into two categories: string and numeric. The numeric data type may include the non-string data types, such as, for example and without limitation, integer, float, double, and Boolean.

String is a data type that is available in many programming languages, although different programming languages may define the type "string" differently. For example, Java programming language defines the type "string" as a Java class "java.lang.String", which represents a string as an immutable array of characters. In this case, once a string variable is declared and created, its value cannot be changed subsequently. Any modification to the value of a string variable results in a new string variable being declared and constructed. Class "java.lang.String" also provides many operations, referred to as "methods", that may be applied to a string variable. On the other hand, with C programming language, a string may be defined as a one-dimensional character array that terminates with a null character. A C string is mutable such that its value may be modified in-place. In fact, each character in the array may be modified individually.

Each programming language generally defines several numeric data types, although the specific numeric data types available may vary from language to language. Integer, float, double, and Boolean are numeric data types that are commonly defined by most programming languages. Again, different programming languages may define specific numeric data types differently. For example, Java programming language provides two ways to declare an integer variable: either as a primitive data type "int", or as a Java class "java.lang.Integer". Class "java.lang.Integer" provides operations (i.e., methods) that may be applied an integer variable. On the other hand, C provides three primitive data types, "short", "int", and "long", that may be used to declare integer variables having different data sizes.

Sometimes, there may be any number of constraints placed on an input, output, or local variable of a software module. In particular embodiments, the constraints placed on a variable may specify, for example and without limitation, what values may be assigned to that variable, the size of the data values that may be assigned to the variable, or any other applicable conditions or limitations placed on the variable. Such variable constraints may be specified by or derived from the design specification or formal requirements of the software module, the specification of the programming language used to implement the software module, the code included in or the programming logic of the software module, the runtime environment within which the software module is executed, or other applicable factors. For example, a constraint may be placed on an integer variable "a" specifying that integer variable "a" may only be assigned integer values that is less than or equal to 0 xFFFFFFFF because the software module is executed within a runtime environment that represents each integer using four bytes. In this case, the constraint placed on integer variable "a" may be represented as an equation: "a<0xFFFFFFFF". As another example, a constraint may be placed on a string variable "s" specifying that the length (i.e., the number of characters) of string variable "s" must be 8. In this case, the constraint placed on string variable "s" may be represented as another equation: "s.length( )=8", using the syntax of Java programming language as an example. Sometimes, a constraint placed on one variable of a software module may depend, directly or indirectly, on the constraint placed on the value of another variable of the software module. For example, two constraints may be jointly placed on an integer variable "b" specifying that: (1) integer variable "b" may only be assigned integer values that is greater than or equal to −10; and (2) integer variable "b" may only be assigned integer values that is less than the value of variable "a". In this case, the two constraints placed on integer variable "b" in combination may be represented as: "(b>=−10) && (b<a)", with each constraint represented as a separate equation.

In particular embodiments, a software module may have any number of numeric or string variables, and these variables may be either input variables or local (i.e., intermediate) variables of the software module. In particular embodiments, a set of constraints may be placed on a specific numeric or string variable of the software module. Note that it is not necessary that a set of constraints is placed on each and every variable of a software module. In particular embodiments, given a numeric variable, it may have any number of numeric constraints or string constraints. For example, integer variable "b" may have a numeric constraint specifying that its value must be greater than or equal to −10 (e.g., constraint "b>=−10"). Integer variable "b" may also have a string constraint specifying that the text (i.e., string) representation of its value must equal to the string "182" (e.g., constraint "b.toString( )="182""). In this case, the set of constraints placed on integer variable "b" includes both numeric and string constraints, and therefore is a hybrid set of constraints (e.g., "(b>=−10) && (b.toString( )="182")"). Similarly, in particular embodiments, given a string variable, it may have any number of string constraints or numeric constraints. For example, string variable s" may have a string constraint specifying that its value must begin with a substring "ca" (e.g., constraint "s.substring(0, 1)="ca"" or "s.startsWith("ca")""). String variable "s" may also have a numeric constraint specifying that its value must have a length of eight characters long (e.g., constraint "s.length( )=8"). In this case, again, the set of constraints placed on string variable "s" includes both numeric and string constraints, and therefore is a hybrid set of constraints (e.g., "(s.substring(0, 1)="ca") && (s.length( )=8)").

In particular embodiments, the constraints placed on a software module may include all the constraints, in combination, placed on its variables, including input, output, and local variables. For example, suppose that integer variable "b" and string variable "s" both belong to a software module "m". In this case, the set of constraints placed on software module "m" itself includes the logical conjunction of the two sets of constraints placed on variables "b" and "s" respectively, which equals "(b>=−10) && (b.toString( )="182") && (s.substring(0, 1)="ca") && (s.length( )=8)". This is also a hybrid set of constraints because the set includes both numeric and string constraints.

Figure 2:
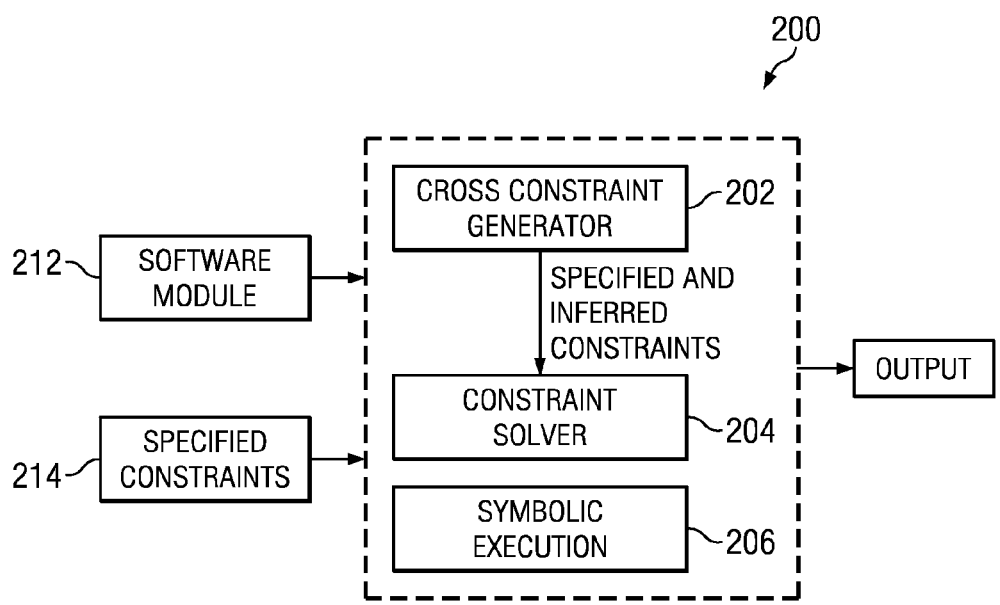
FIG. 2 illustrates an example system for determining and solving constraints placed on a software module or its variables.

In particular embodiments, it may be useful to determine and solve a hybrid set of constraints placed on a software module that has any number of numeric or string variables. It may also be useful to determine and solve a hybrid set of constraints placed on a specific variable of a software module. In particular embodiments, solving a set of constraints means attempting to find one or more solutions that satisfy all the constraints included in the set. FIG. 1 illustrates an example method for determining and solving constraints placed on a software module or a variable of a software module. FIG. 2 illustrates an example system 200 for determining and solving constraints placed on a software module or a variable of a software module. In particular embodiments, the components of system 200 illustrated in FIG. 2 may be implemented as computer hardware or software or a combination thereof. FIGS. 1 and 2 are described in connection with each other.

In particular embodiments, a software module may have any number of numeric variables or string variables. For example, a software module "m" may have an integer variable "vi", a Boolean variable "vb", and a string variable "vs". In this case, variables "vi" and "vb" are numeric variables. In particular embodiments, these variables may be input, output, or local variables of the software module.

In particular embodiments, initially, there may be any number of numeric constraints placed on specific numeric variables of the software module, and any number of string constraints placed on specific string variables of the software module. More specifically, a set of numeric constraints may be specified for and placed on a particular numeric variable, or a set of string constraints may be specified for and placed on a particular string variable. Each set of constraints may include one or more specific constraints. For example, a set of numeric constraints, "nc1-vi", may be specified for and placed on integer variable "vi"; a set of numeric constraints, "nc1-vb", may be specified for and placed on Boolean variable "vb"; and a set of string constraints, "sc1-vs", may be specified for and placed on string variable "vs". In particular embodiments, these initial sets of constraints (e.g., "nc1-vi", "nc1-vb", and "sc1-vs") may be specified based on the design specification or formal requirements of the software module.

In particular embodiments, within the software module, there may be any number of operations applied to specific numeric variables of the software module, which take numeric input or produce numeric output. For example, an operation applied to integer variable "vi" may be "ri=vi+10", which takes two numeric values, the value of "vi" and "10", as input and produces a numeric value, the value of "ri", as output.

In particular embodiments, within the software module, there may be any number of operations applied to specific numeric variables of the software module, which take string input or produce string output. For example, an operation applied to Boolean variable "vb" may be "vb.toString( )", which produces a string value, which is a string representation of the value of Boolean variable "vb" (e.g., the string "true"), as its output.

In particular embodiments, within the software module, there may be any number of operations applied to specific string variables of the software module, which take string input or produce string output. For example, an operation applied to string variable "vs" may be "rs=vs.concat("abc")", which takes two string values, the value of "vs" and "abc", as input and produces a string value, the value of "rs", as output.

In particular embodiments, within the software module, there may be any number of operations applied to specific string variables of the software module, which take numeric input or produce numeric output. For example, an operation applied to string variable "vs" may be "vs.length( )", which produces a numeric value as its output indicating the number of characters contained in the value of string variable "vs". Another operation applied to string variable "vs" may be "vs.substring(5, 7)", which takes two numeric values as input.

Particular embodiments may analyze a software module (e.g., software module "m") and the sets of numeric constraints initially specified for and placed on specific numeric variables (e.g., numeric constraints "nc1-vi" placed on integer variable "vi" and numeric constraints "nc1-vb" placed on Boolean variable "vb") of the software module and the sets of string constraints initially specified for and placed on specific string variables (e.g., string constraints "sc1-vs" placed on string variable "vs") of the software module, as illustrated in step 102 of FIG. 1. In particular embodiments, the numeric and string constraints may initially be placed on either the input or the intermediate (i.e., the local) variables of the software module. Of course, in particular embodiments, it is not necessary that a set of numeric constraints is initially placed on each and every numeric variable of the software module, and a set of string constraints is initially placed on each and every string variable of the software module. It is possible that only specific numeric variables initially have associated numeric constraints, or only specific string variables initially have associated string constraints.

In particular embodiments, for a numeric or string constraint initially placed on an input variable of the software module, the constraint may be determined according to the design specification or formal requirements of the software module. For a numeric or string constraint initially placed on an intermediate variable of the software module, the constraint may be determined by performing symbolic execution on the software module. Symbolic execution is described in more detail below in connection with FIG. 8. Briefly, particular embodiments may perform symbolic execution on the software module while assigning a symbolic value to each of the input variables of the software module. Since an intermediate variable of the software module may depend, directly or indirectly, on one or more of the input variables of the software module, performing symbolic execution on the software module may result in, for the intermediate variable, a set of symbolic expressions indicating the dependency it has on the specific input variables. Particular embodiments may then determine a set of constraints placed on the intermediate variable based on the set of symbolic expressions obtained for the intermediate variable and the constraints placed on the specific input variables upon which the intermediate variable depend. For example, suppose that with software module "m", "vi" is an input variable; "ri" is an intermediate variable; and "ri=vi+10". In this case, performing symbolic execution on software module "m" may determine that intermediate variable "ri" depends on input variable "vi". Further suppose that a numeric constraint has been placed on input variable "vi" such that "vi>0". Based on the result of the symbolic execution and the numeric constraint placed on input variable "vi", a numeric constraint may be determined for intermediate variable "ri" such at "ri>10".

From the analysis illustrated in step 102 of FIG. 1, particular embodiments may infer sets of string constraints placed on specific numeric variables of the software module and sets of numeric constraints placed on specific string variables of the software module, as illustrated in step 104 of FIG. 1. In particular embodiments, steps 102 and 104 of FIG. 1 may be performed by component 202 of system 200 illustrated in FIG. 2. In particular embodiments, component 202 may take as input a software module 212 and constraints 214 initially placed the variables of software module 212, which may include the numeric constraints initially specified for and placed on the numeric variables of the software module and the string constraints initially specified for and placed on the string variables of the software module. Component 202 may perform applicable analysis to infer string constraints to be placed on the numeric variables of software module 212 and numeric constraints to be placed on the string variables of software module 212. Component 202 may provide as output hybrid sets of numeric and string constraints that include both the specified and the inferred constraints placed on the variables of software module 212.

In particular embodiments, the constraints for the variables of the software module may be inferred based on various factors, and the present disclosure contemplates any applicable factor. For example and without limitation, numeric constraints may be inferred for both numeric and string variables and string constraints may be inferred for both numeric and string variables based on the operations applied to the specific variables, the specification of the programming language used to implement the software module, the runtime environment in which the software module is executed, or a combination of multiple factors.

In particular embodiments, given a numeric variable, a string constraint may be inferred based on an operation applied to the numeric variable, which may produce a string result. For example, suppose that the following two operations are applied to integer variable "vi" in software module "m", "(vi.toString( )).split("0")", which first produce a string representation of the value of integer variable "vi" (e.g., number 182 is represented as string "182") and then split the string into two new strings at the location of character "0". In order for the second operation (i.e., the string split operation) to be successful (e.g., not resulting in a null string), a string constraint may be inferred from the operations that the string representation of the value of integer variable "vi" must include at least one character "0".

In particular embodiments, given a numeric variable, a numeric constraint may be inferred based on an operation applied to the numeric variable, which may produce a numeric result. For example, suppose that the following operation is applied to integer variable "vi" in software module "m", "Math.sqrt(vi)", which provides the square root of the value of integer variable "vi". In order to perform this operation without encountering an error, a numeric constraint may be inferred from the operation specifying that the value of integer variable "vi" must be greater than or equal to 0.

In particular embodiments, given a string variable, a string constraint may be inferred based on an operation applied to the string variable, which may produce a string result. For example, suppose that the following operation is applied to string variable "s" in software module "m", "s.repalceAll ("abc", "xyz")", which replaces all substrings "abc" found in the value of string variable "s" with "xyz". In order for the operation to have any actual effect on the value of string variable "s", a string constraint may be inferred from the operation that the value of string variable "s" must include at least one occurrence of substring "abc".

In particular embodiments, given a string variable, a numeric constraint may be inferred based on an operation applied to the string variable, which may produce a numeric result, or based on an operation applied to the string variable, which may take one or more numeric input. For example, suppose that the following operation is applied to string variable "s" in software module "m", "s.startsWith("abc")", which provides a Boolean result, as true or false, indicating whether the value of string variable "s" starts with substring "abc". In order to perform this operation successfully, the value of string variable "s" must have at least three characters. Thus, a numeric constraint may be inferred from this operation specifying that the length of string variable "s" must be greater than or equal to 3. As another example, suppose that the following operation is also applied to string variable "s" in software module "m", "s.substring(6)", which takes a numeric value as input. In order to perform this operation successfully (e.g., not resulting in a null string), the value of string variable "s" must have at least six characters. Thus, a numeric constraint may be inferred from this operation specifying that the length of string variable "s" must be greater than or equal to 6.

In the above examples, within a software module, operations may be applied to numeric variables that produce string results; or, operations may be applied to string variables that take numeric input or produce numeric results. In particular embodiments, from these operations, numeric constraints may be inferred for and placed on specific string variables, and string constraints may be inferred for and placed on specific numeric variables. In particular embodiments, given a variable, either numeric or string, a complete set of constraints placed on the variable includes both the constraints initially specified for the variable, if any, and the constraints inferred for the variable, if any. This set of constraints may include either numeric constraints or string constraints or both. Because the set of constraints placed on the variable may include constraints inferred for the variable based on the individual operations applied to the variable, particular embodiments refer to the set of constraints thus obtained as an interacting hybrid set of constraints. In particular embodiments, given a software module that has any number of numeric or string variables, the set of constraints placed on the software module itself includes all the constraints placed on the individual variables of the software module.

Given a hybrid set of constraints placed on a variable of a software module or a software module itself, particular embodiments may represent each numeric constraint in the set with a mathematical equation (e.g., "vi>=0", "vb=true", or "s.length( )>=6") and each string constraint in the set with a finite state machine (FSM), as illustrated in step 106 of FIG. 1.

Figure 3:
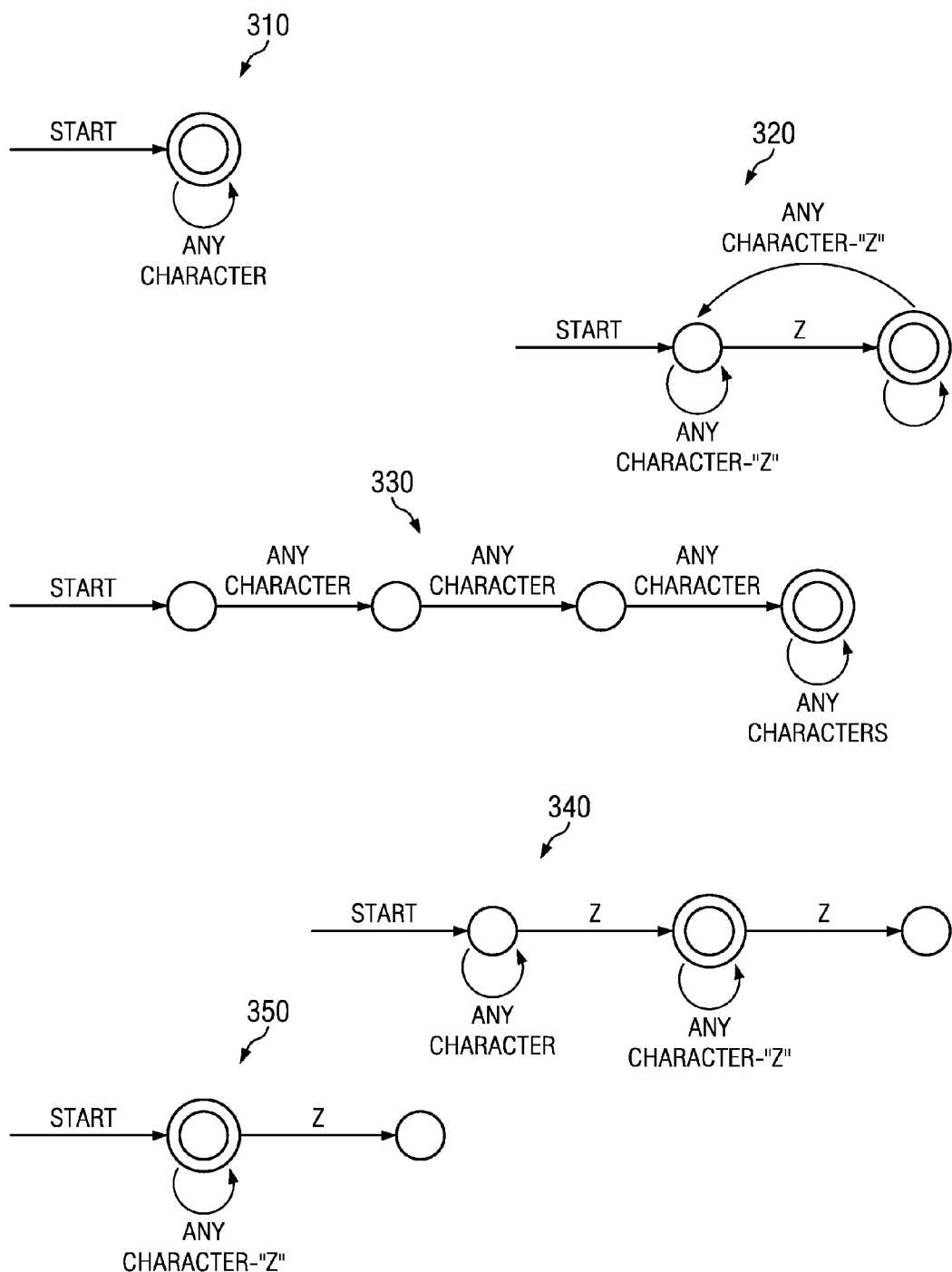
FIG. 3 illustrates several example finite state machines used to represent different strings.

In general, a FSM is a model of behavior composed of a finite number of states, transitions between these states, and actions. In particular embodiments, a FSM may be used to represent a string. FIG. 3 illustrates several FSMs used to represent strings. In FIG. 3, with each FSM, an intermediate state is represented by a single circle; an accepting state is represented by a double circle; and an input to a state is represented by an arrow leading to the circle.

For example, FSM 310 represents a string, "S", that may have any character and of any length. FSM 320 represents a string, "S", that has at least one character and the last character of the string is "Z", and may be used to represent the constraint "S.endsWith("Z")=true". FSM 330 represents a string, "S", that has three or more characters, and may be used to represent the constraint "S.length( )>=3".

FSM 340 represents a string, "S", that has at least one character and contains at least one "Z" and the "Z" transition signifies the last "Z" in the string. FSM 350 represents a string, "S", that does not have any character that is "Z". Consider the constraint "(a=S.lastIndexOf("Z"))". From this constraint it can be inferred that if "a>=0", then "(S.substring (a, a+1)="Z")". FSM 340 represents the case when the above constraints are satisfied; that is, string "S" contains at least one "Z" character and the last "Z" occurring in "S" is at the index that equals the value of "a". On the other hand, FSM 350 represents the case when the set of constraints is not satisfied; that is, string "S" does not contain any character "Z", and thus "a=−1". Hence the constraint "a=S.lastIndexOf ("Z")" results in a fork in the symbolic execution tree and on one branch it assumes the case of FSM 340 with additional numeric constraint "a>=0" while on the other branch it assumes the case of FSM 350 with additional constraint "a=−1".

Figure 4:
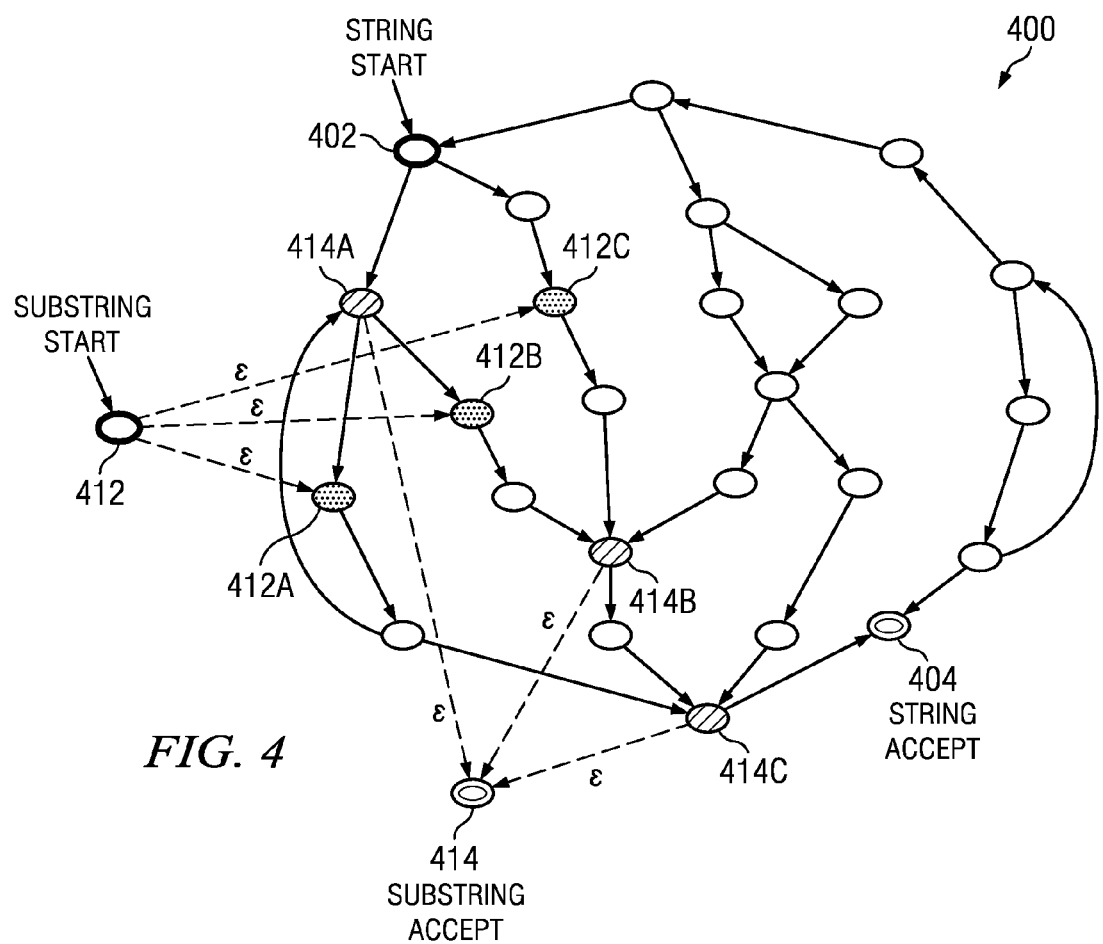
FIG. 4 illustrates an example finite state machine used to represent a string and its substring.

FIG. 4 illustrates another example FSM 400 used to represent a string, "S", and one of its substrings, "S.substring(2, 4)". In this example, state 402 is the starting point of string "S", and state 404 is the accepting state (i.e., the ending point) of string "S". Substring "S.substring(2, 4)" is the substring of "S" that beings at the third character and ends at the fifth character. Note that according to Java programming language, indexing beings with 0; that is, the index number of the first element is 0. Therefore, index number 2 refers to the third element and index number 4 refers to the fifth element. For substring "S.substring(2, 4)", a starting point is the third state down from starting state 402 of string "S", which corresponds to the third character of string "S". In FIG. 4, there are three states, 412A, 412B, 412C, that each are the third state down from starting state 402, and any one of them is a possible starting state 412 for substring "S.substring(2, 4)". For substring "S.substring(2, 4)", an ending point (i.e., an accepting state) is the fifth state down from starting state 402 of string "S", which corresponds to the fifth character of string "S". In FIG. 4, there are again three states, 414A, 414B, 414C, that are each the fifth state down from starting state 402, and any one of them is a possible accepting state 414 for substring "S.substring(2, 4)". Note that in FIG. 4, "$\epsilon$" marks a null-input transition.

In particular embodiments, given any set of constraints, each numeric constraint from the set may be represented using an applicable mathematical equation, and each string constraint from the set may be represented using an applicable FSM. In addition, given a set of constraints thus represented, particular embodiments may attempt to solve the constraints in order to find one or more solutions that satisfy all the constraints in the set at the same time, as illustrated in step 108 of FIG. 1. In particular embodiments, step 108 of FIG. 1 may be performed by component 204 of system 200 illustrated in FIG. 2. In particular embodiments, component 204 may be a constraint solver implemented based in part on the Satisfiability Modulo Theories (SMT). In particular embodiments, component 204 may take as input a set of constraints, which may include either or both numeric constraints represented using mathematical equations and string constraints represented using FSMs, and attempt to find one or more solutions that satisfy all the constraints from the set. If any solution may be found, component 204 may provide the solution as its output. Of course, it is possible that a set of constraints may not have any solution that satisfy all the constraints from the set. For example, consider the set of constraints, "(s.equals(q)) && (s.startsWith("uvw")) && (q.endsWith("xyz")) && (s.length( )<a) && ((a+b)<6) && (b>0)", where "s" and "q" are strings and "a" and "b" are integers. There is no combination of values for "s", "q", "a", and "b" that can satisfy all the constraints from this set at the same time. Therefore, this particular set of constraints is unsatisfiable.

Particular embodiments may solve a hybrid set of constraints using an iterative algorithm. Particular embodiments may group all the string constraints from the set, represented using FSMs, in a string domain, and all the numeric constraints from the set, represented using mathematical equations, in a numeric domain. Particular embodiments may then iteratively attempt to find one or more solutions in either the numeric domain or the string domain alone (i.e., solutions that satisfy either all the numeric constraints in the set or all the string constraints in the set), and feed the solutions found in one domain to the other domain, until: (1) one or more solutions are found to satisfy all the numeric and string constraints in the set; (2) it is determined that there is no solution that satisfies all the constraints in the set (i.e., the set of constraints is unsatisfiable); or (3) the number of iterations performed has reached a predetermined threshold, whichever occurs first. Particular embodiments may solve the numeric constraints in the numeric domain using a Satisfiability Modulo Theory (SMT) solver, and solve the string constraints in the string domain using regular expression union, intersection, complement, Kleene star, and other applicable algorithms. In addition, particular embodiments may take the following into consideration when attempting to find one or more solutions for a hybrid set of constraints. First, if the numeric constraints in the numeric domain alone are unsatisfiable (i.e., there is no solution that satisfies just the numeric constraints in the set), then the entire set of constraints is unsatisfiable. Second, if the solution for the string constraints in the string domain alone is a null string (i.e., an empty string), then, if there is no numeric constraint in the set at all, then the set is unsatisfiable; otherwise, the numeric constraints in the set is further constrained by the null string.

To explain the iterative process further, consider an example set of constraints, "s.startsWith("uvw") && s.endsWith("xyz") && (a=s.lastIndexOf("t")) && (s.length( )<=b) && (b+c<=8) && ((a+d)>=4) && (c>0) && (d<0)", where "s" is a string and "a", "b", "c", and "d" are integers. A solution that satisfies this set of constraints means that there is a combination of five values for string "s" and integers "a", "b", "c", and "d", respectively, that causes all the individual constraints in the set to be satisfied (i.e., all the conditions to be true) at the same time. More specifically, in order to satisfy constraint "s.startsWith("uvw")", the first three characters of "s" must be "uvw". In order to satisfy constraint "s.endsWith("xyz")", the last three characters of "s" must be "xyz". In order to satisfy constraint "a=s.lastIndexOf("t")", the last occurrence of character "t" in "s" must have an index number that equals the value of "a". In order to satisfy constraint "s.length( )<=b", the number of characters in "s" must be less than or equal to the value of "b". In order to satisfy constraint "b+c<=8", the sum of the values of "b" and "c" must be less than or equal to 8. In order to satisfy constraint "(a+d)>=4", the sum of the values of "a" and "d" must be greater than or equal to 4. In order to satisfy constraint "c>0", the value of c" must be greater than 0. And in order to satisfy constraint "d<0", the value of d" must be less than 0.

Figure 5:
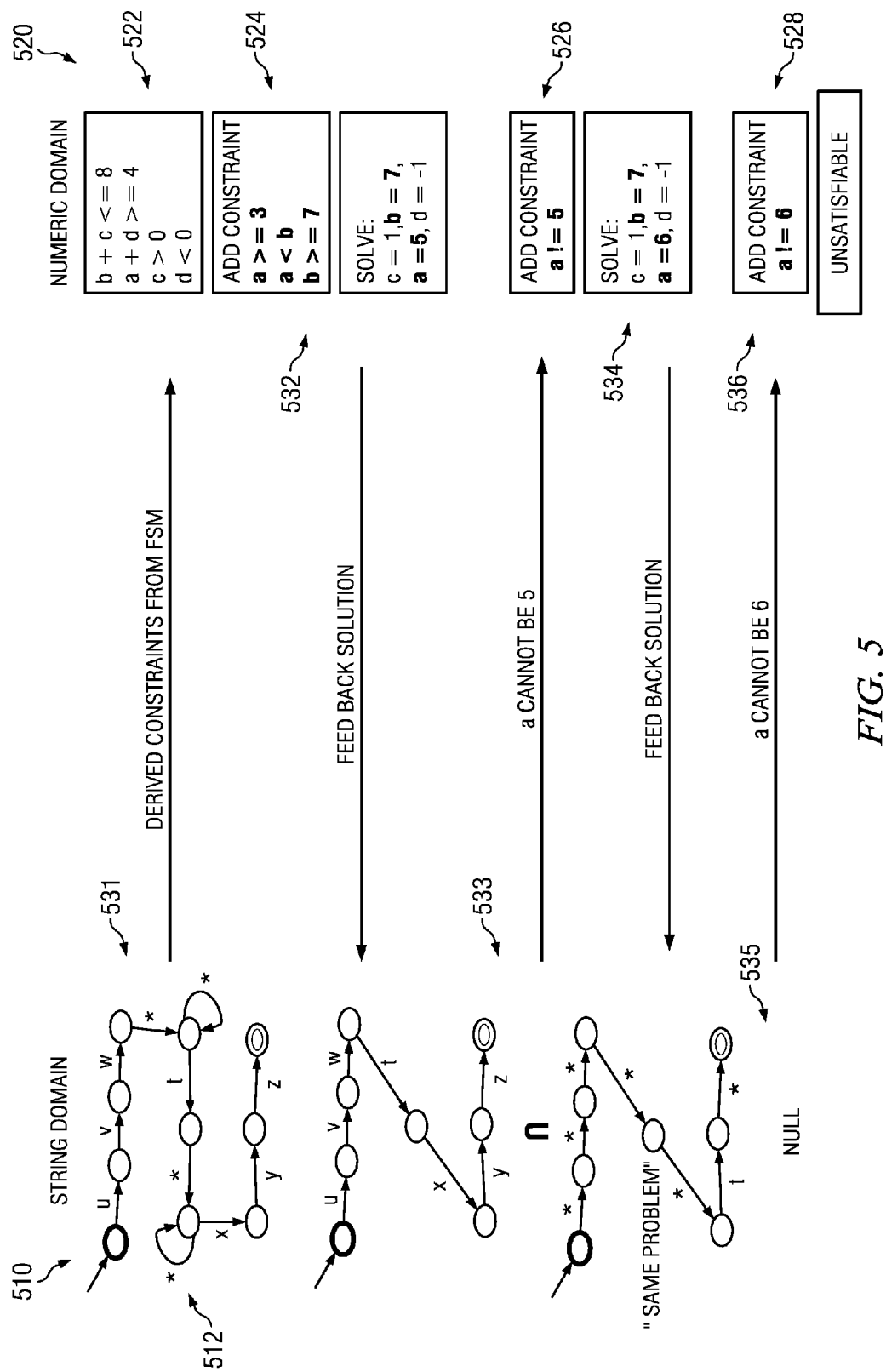
FIG. 5 illustrates an example set of constraints with the string constraints placed within the string domain and the numeric constraints placed within the numeric domain.

FIG. 5 illustrates placing the string constraints 512 in the above example set of constraints in a string domain 510 and the numeric constraints 522 in the above example set of constraints in a numeric domain 520. During the first iteration 531, particular embodiments may attempt to find a solution in string domain 510 alone. The three string constraints 512 together require that: (1) the first three characters of string "s" must be "uvw"; (2) the last three characters of string "s" must be "xyz"; (3) there must be at least one occurrence of "t" in string "s"; and (4) "t" must come after "uvw" but before "xyz". Therefore, the shortest string that satisfies all four requirements is "uvwtxyz". There are other possible longer strings that also satisfy all four requirements (e.g., "uvwabthxyz" or "uvwt3fkxyz"). However, particular embodiments always select the simplest possible solution first (i.e., the shortest string or the smallest value that satisfy all the requirements dictated by the string or numeric constraints). In this case, the shortest string that satisfies all four requirements is "uvwtxyz". This string solution, "uvwtxyz", found in string domain 510 is fed to numeric domain 520 to help find a solution for "a", "b", "c", and "d".

During the second iteration 532, particular embodiments may derive additional constraints 524 placed on integers "a", "b", "c", or "d" from the solution found for "s" during the previous iteration (i.e., "uvwtxyz"). For example, constraint "s.length( )<=b" requires that the number of characters in "s" must be less than or equal to the value of "b". Because the shortest string solution for "s" found in string domain 510 must have a minimum of seven characters, this means that "b>=7". Constraint "a=s.lastIndexOf("t")" requires that the last occurrence of character "t" in "s" must have an index number that equals the value of "a". Since "t" is not the last character in "s", this means that "a<b". In addition, since "t" cannot be any of the first three characters in "s", this also means that "a>=3". Particular embodiments may add the three additional numeric constraints 524 placed on "a", "b", and "c", which are derived from the solution for "s", to the four numeric constraints 522 originally from the set, and attempt to find values for "a", "b", "c", and "d" that satisfy all the numeric constraints 522, 524, including those originally from the set as well as those derived from the solution for string "s". Again, if there are multiple values for integers "a", "b", "c", and "d" that satisfy all the numeric constraints, particular embodiments select the smallest values first. From the four original numeric constraints 522 from the set and the three additional, derived numeric constraints 524, particular embodiments may determine a possible solution for "a", "b", "c", and "d" as "a=5", "b=7", "c=1" and "d=−1". In fact, for "a", there are two possible values, 5 and 6. The value 5 is the smallest and therefore is selected first for "a". These four values are fed back to string domain 510 to be verified against the string constraints.

During the third iteration 533, the solution for "a", "b", "c", and "d" found in numeric domain 520 during the second iteration 532 is verified against the string constraints in string domain 510. If "s" is "uvwtxyz", then "a" cannot equal 5, because the index of "t" is 3, which should equal the value of "a". This new constraint 526 on "a" (i.e., "a !=5") is again fed back to numeric domain 520.

During the fourth iteration 534, constraint 526, "a !=5", is added to the other existing numeric constraints 522, 524. The next possible solution for "a", "b", "c", and "d" that satisfy all currently existing numeric constraints 522, 524, 526 is "a=6", "b=7", "c=1" and "d=−1". This solution is fed back to string domain 510.

During the fifth iteration 535, the solution found for "a", "b", "c", and "d" (i.e., "a=6", "b=7", "c=1" and "d=−1") in numeric domain 520 during the previous iteration is similarly verified against the string constraints in string domain 510. Again, if "s" is "uvwtxyz", then "a" cannot equal 6. This yields a new constraint 528 on "a", "a !=6", and is fed back to numeric domain 520.

During the sixth iteration 536, constraint 528, "a !=6", is again added to the other existing numeric constraints 522, 524, 526. An attempt is made to find a solution that satisfy all numeric constraints 522, 524, 526, 528. However, there is no values for "a", "b", "c", and "d" that satisfy all currently existing numeric constraints 522, 524, 526, 528. Therefore, if "s" equals "uvwtxyz", then there is no solution that can be found for "a", "b", "c", and "d" that satisfies all the numeric constraints. Note that in this case, "s" cannot have more than seven characters because of the three constraints "s.length( )<=b", "b+c<=8", and "c>0". More specifically, since "c>0", the smallest value "c" may have is 1. Since "b+c<=8", if the smallest value "c" may have is 1, then the largest value "b" may have is 7. This means that the longest length "s" may have is seven characters because "s.length( )<=b". At this point, it has been determined that this set of constraints is unsatisfiable. Therefore, the process may stop.

The example process illustrated in FIG. 1 may be used to determine a hybrid set of constraints (i.e., a set of constraints that includes both numeric and string constraints) placed on a software module or a particular variable of a software module, and attempt to find a solution that satisfy all the constraints from the set. There are various practical applications for such a process.

In particular embodiments, a process, such as the one illustrated in FIG. 1, may be used to automatically generate test data for a software module. The test data may then be used to test and detect errors in the software module. Often, a software module may include any number of conditional branching points (e.g., the "if-else" statements), and each conditional branching point has a branching condition specified by one or more variables (e.g., input variables or local variables) of the software module. Depending on whether the branching condition is satisfied, the software module may proceed down different execution paths at the conditional branching point. To explain conditional branching points further, consider the following example code segment of an example software module:

SAMPLE CODE 1

```
1   if (m > n && k <= 10) {
2       ...
3       if (k > 2) {
4           ...
5       } else {
6           if (n == k || n == m) {
7               ...
8           } else {
9               ...
10          }
11      }
12  } else {
13      ...
14  }
```

In the above example, "m", "n", and "k" may be variables of the example software module. At line 1 there is a conditional branching point, and the branching condition is "m>n && k<=10". Note that a branching condition may include multiple sub conditions (e.g., "m>n" and "k<=10"). For the branching condition at line 1 to be satisfied (i.e., to hold true), the value of variable "m" needs to be greater than the value of variable "n", and the value of variable "k" needs to be less than or equal to 10. If the branching condition at line 1 is satisfied, then the code between lines 2-11 is executed. Otherwise (i.e., if the branching condition at line 1 is not satisfied), then the code at line 13 is executed. At line 3 there is another conditional branching point, and the branching condition is "k>2". For the branching condition at line 3 to be satisfied, the value of variable "k" needs to be greater than 2. Similarly, if the branching condition at line 3 is satisfied, then the code at line 4 is executed. Otherwise, the code between lines 6-11 is executed. At line 6 there is a third conditional branching point, and the branching condition is "n==k||n==m", which also includes multiple sub conditions (e.g., "n==k" and "n==m"). For the branching condition at line 6 to be satisfied, the value of variable "n" needs to equal either the value of variable "k" or the value of variable "m". If the branching condition at line 6 is satisfied, then the code at line 7 is executed. Otherwise, the code at line 9 is executed.

Furthermore, the conditional branching point at line 3 is nested within the conditional branching point at line 1, and the conditional branching point at line 6 is further nested within the conditional branching point at line 3. If the branching condition associated with the conditional branching point at line 1 is not satisfied, the conditional branching point at line 3 is never reached during execution of the code. However, if the branching condition associated with the conditional branching point at line 3 is not satisfied, the conditional branching point at line 6 is reached during execution of the code. In fact, in order to reach the conditional branching point at line 6, the branching condition at line 1 needs to be satisfied but the branching condition at line 3 cannot be satisfied.

Figure 6:
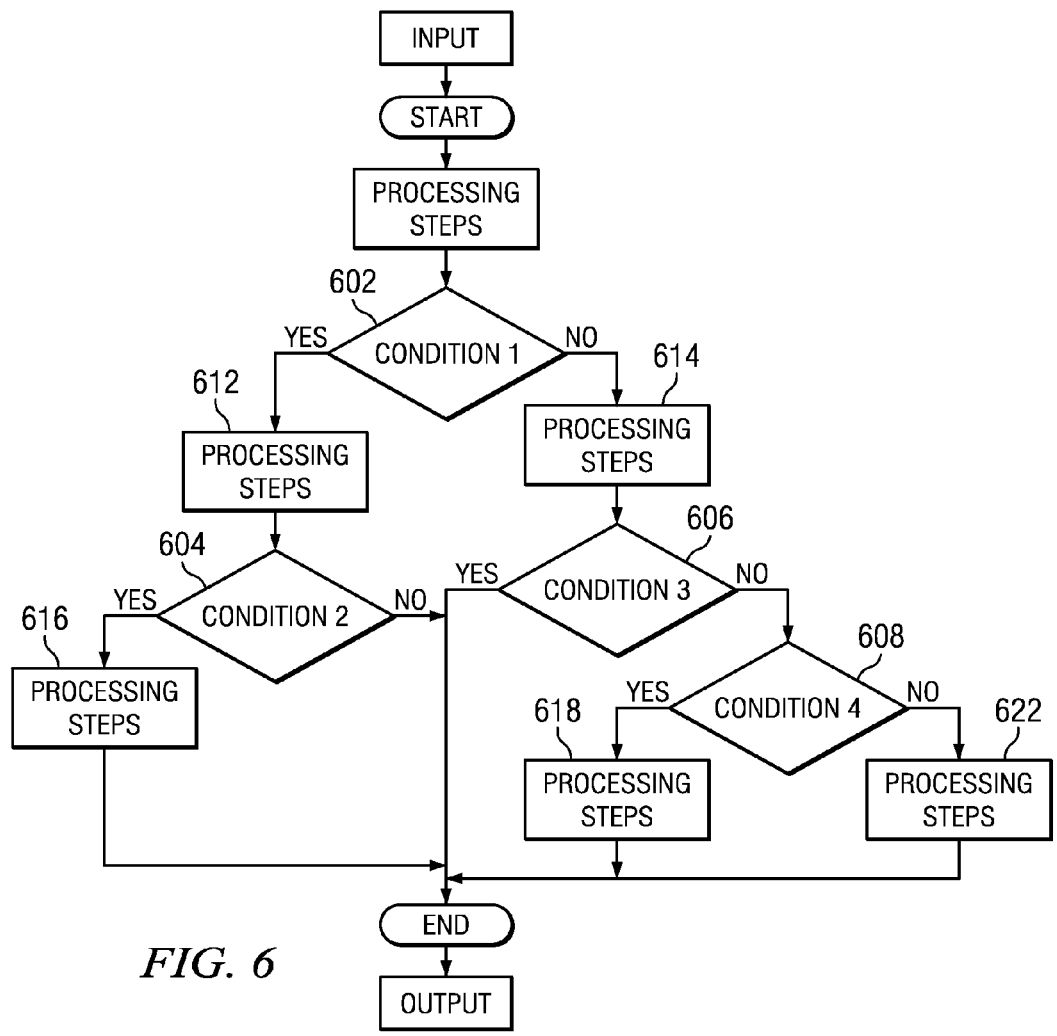
FIG. 6 illustrates execution paths of an example software module that has multiple levels of nested conditional branches.

Therefore, at each conditional branching point in a software module, depending on whether the branching condition associated with the conditional branching point is satisfied, the software module proceeds along a different execution path. FIG. 6 illustrates execution paths of an example software module that has multiple levels of nested conditional branches. At conditional branching point 602, if "CONDITION 1" is satisfied, the execution path proceeds toward processing steps 612, and if "CONDITION 1" is not satisfied, the execution path proceeds toward processing steps 614. At conditional branching point 604, which is nested within conditional branching point 602, if "CONDITION 2" is satisfied, the execution path proceeds toward processing steps 616, and if "CONDITION 2" is not satisfied, the execution path ends. At conditional branching point 606, which is also nested within conditional branching point 602, if "CONDITION 3" is satisfied, the execution path ends, and if "CONDITION 3" is not satisfied, the execution path proceeds toward conditional branching point 608. And at conditional branching point 608, which is further nested within conditional branching point 606, if "CONDITION 6" is satisfied, the execution path proceeds toward processing steps 618, and if "CONDITION 6" is not satisfied, the execution path proceeds toward processing steps 622. In FIG. 6, there are five possible execution paths, and the software module may proceed along any one of the five possible execution paths depending on whether the branching conditions are satisfied at the individual conditional branching points 602, 604, 606, 608.

Particular embodiments may consider the branching conditions as numeric or string constraints placed on the variables that represent the branching conditions. For example, at line 1 of SAMPLE CODE 1, the branching condition is "m>n && k<=10". If the branching condition is satisfied, then the value of "m" must be greater than the value of "n" and the value of "k" must be less than or equal to 10. This may be represented as a set of constraints placed on "m", "n", and "k" as "(m>n) && (k<=10)". Any solution for "m", "n", and "k" that satisfies this set of constraints may result in the branching condition to be satisfied (i.e., hold true) and cause the software module to proceed along one execution path (i.e., the "if" portion of the code). If the branching condition is not satisfied, then either the value of "m" is less than or equal to the value of "n" or the value of "k" is greater than 10. This may be represented as another set of constraints placed on "m", "n", and "k" as "(m<=n)||(k>10)". Any solution for "m", "n", and "k" that satisfies this second set of constraints may result in the branching condition not to be satisfied (i.e., hold false) and cause the software module to proceed along another execution path (i.e., the "else" portion of the code).

Figure 7:
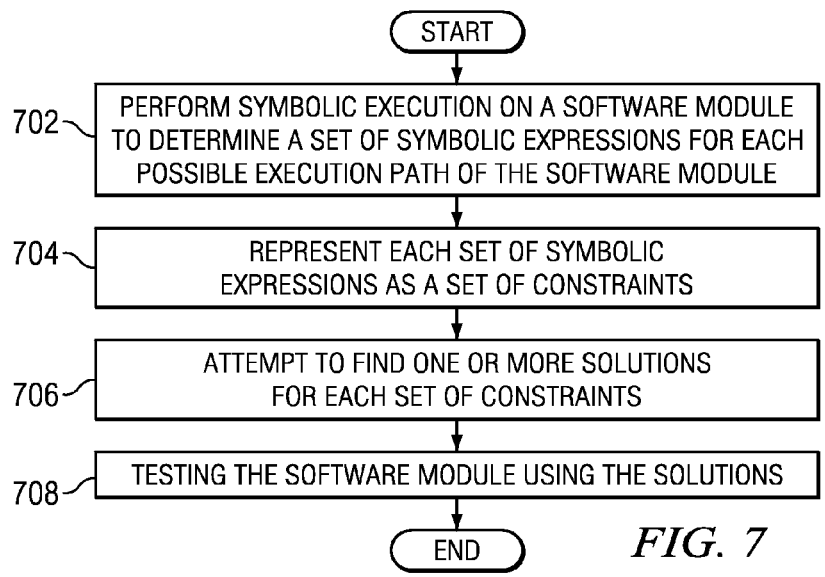
FIG. 7 illustrates an example method for testing a software module.

Consequently, particular embodiments may determine a set of constraints corresponding to each possible execution path in a software module, find one or more solutions for each set of constraints, and test the software module using the solutions as test input. FIG. 7 illustrates an example method for testing a software module that include multiple possible execution paths resulting from one or more conditional branching points. In particular embodiments, a software module may have any number of variables (e.g., input or local variables) and any number of conditional branching points (e.g., the "if-else" statements). Each conditional branching point may be associated with a branching condition that is specified by one or more of the variables. In particular embodiments, a branching condition may include any number of sub-conditions. Depending on whether the branching condition associated with a conditional branching point is satisfied, the software module may proceed along different execution paths.

Particular embodiments may perform symbolic execution on the software module to determine, for each possible execution path of the software module, a set of symbolic expressions that causes the software module to proceed along and reach the end of that execution path, as illustrated in step 702 of FIG. 7. When determining each set of symbolic expressions, particular embodiments may incorporate the numeric and string constraints initially placed on the specific variables of the software module (e.g., as described in connection with step 102 of FIG. 1), if any, as well as the numeric and string constraints inferred for the specific variables of the software module (e.g., as described in connection with step 104 of FIG. 1), if any. In particular embodiments, step 702 of FIG. 7 may be performed by component 206 of system 200 illustrated in FIG. 2, which may take as input a software module 212, perform symbolic execution on software module 212, and provide as output sets of symbolic expressions corresponding to the execution paths of software module 212.

In the field of computer science, symbolic execution refers to the analysis of software programs by tracking symbolic rather than actual values, as a case of abstract interpretation. It is a non-explicit state model-checking technique that treats input to software modules as symbol variables. It creates complex mathematical equations or expressions by executing all finite paths in a software module with symbolic variables and then solves the complex equations with a solver (typically known as a decision procedure) to obtain error scenarios, if any. In contrast to explicit state model checking, symbolic execution is able to work out all possible input values and all possible use cases of all input variables in the software module under analysis. To further explain symbolic execution, consider an example software module named "foo":

SAMPLE CODE 2

```
1   foo (a, b) {
2       string a, b, c, d;
3       c = a.concat(b);
4       if !(c.equals("qrs")) {
5           d = c.concat("t");
6           return d;
7       } else {
8           return c;
9       }
10  }
```

Software module "foo" has two input variables "a" and "b" and two local variables "c" and "d". In particular embodiments, the value of a local variable may depend, directly or indirectly, on the value of one or more input variables of the software module. For example, with module "foo", the value of local variable "c" depends directly on the values of input variables "a" and "b", as indicated by line 3 of the code; and the value of local variable "d" depends indirectly on the values of input variables "a" and "b", through local variable "c", as indicated by line 5 of the code. In addition, module "foo" contains a conditional branching point at line 4 of the code, caused by the "if-else" statement. The conditional branching point at line 4 is associated with a branching condition "!(c.equals("qrs"))". Depending on whether this branching condition is satisfied or holds true—that is, whether local variable "c" equals "qrs"-module "foo" proceeds down different execution paths and different portions of the code of module "foo" is actually executed. More specifically, if local variable "c" does not equal "qrs", then the value of local variable "d" is computed and returned, as indicated by lines 5 and 6 of the code. On the other hand, if local variable "c" does equal "qrs", then the value of local variable "c" is returned, as indicated by line 8 of the code.

Figure 8:
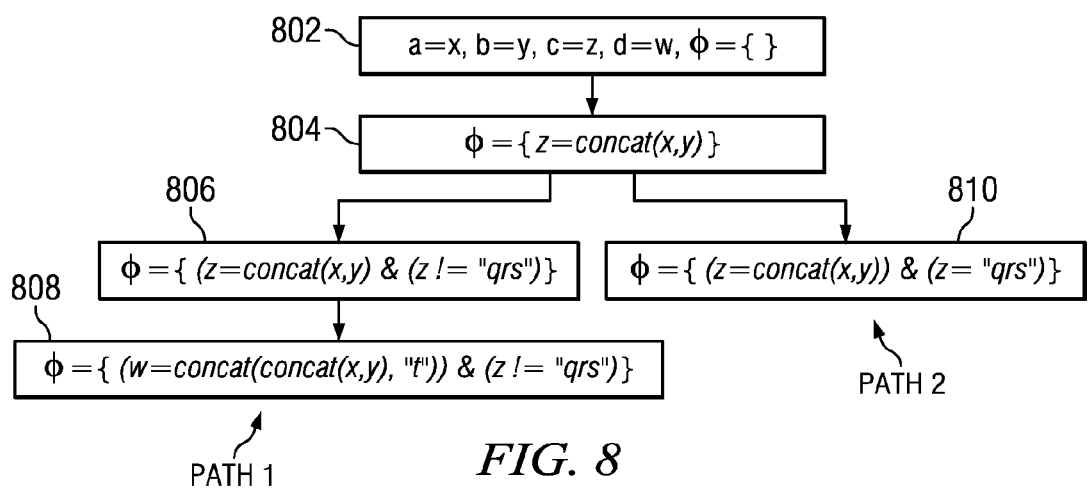
FIG. 8 illustrates an example execution flow representing the steps of performing symbolic execution on an example software module.

When symbolic execution is performed on module "foo", its input and local variables are each assigned a symbolic value instead of an actual value. FIG. 8 illustrates an example execution flow 800 representing the steps of performing symbolic execution on module "foo". In this example, input variable "a" is assigned symbolic value "x"; input variable "b" is assigned symbolic value "y"; local variable "c" is assigned symbolic value "z"; and local variable "d" is assigned symbolic value "w". Since variables "a", "b", "c", and "d" are of type "string", symbolic values "x", "y", "z", and "w" each represent an arbitrary string.

In addition, "Φ" is the symbolic expression that represents the result of the symbolic execution at various points along the execution paths. More specifically, at 802, which corresponds to line 2 of the code of module "foo", variables "a", "b", "c", and "d" are assigned their respective symbolic values "x", "y", "z", and "w", and "Φ" initially has an empty or null expression. As the execution proceeds further, expressions are added to "Φ" depending on what code has been executed. At 804, which corresponds to line 3 of the code of module "foo", "Φ" has the expression "z=concat(x, y)" because line 3 of the code is "c=a.concat(b)" and "x", "y", and "z" are the symbolic value assigned to variable "a", "b", and "c", respectively. Next, line 4 of the code of module "foo" is a conditional branching point and there are two possible execution paths down which the execution may proceed. Thus, the symbolic execution may also proceed down two different paths from 804: the first path, PATH 1, includes 806 and 808 corresponding to lines 5 and 6 of the code; and the second path, PATH 2, includes 810 corresponding to line 8 of the code.

In order to proceed down PATH 1, variable "c" does not equal "qrs", which means symbolic value "z" does not equal "qrs". Therefore, the expression "z !="qrs"" is added to "Φ" at 806. Conversely, in order to proceed down PATH 2, variable "c" does equal "qrs", which means symbolic value "z" equals "qrs". Therefore, the expression "z="qrs"" is added to "Φ" at 810. Along PATH 1, the value of variable "d" is determined at line 5 of the code, which corresponds to 808. Therefore, the expression "w=concat(z, "t")" is added to "Φ" at 808. Note that because "z=concat(x, y)", the expression for "w" may be rewritten as "w=concat(concat(x, y), "t")". 808 is the end of PATH 1, and thus, the expression of "Φ" at 808 represents the conditions, in symbolic form, that need to be satisfied in order to reach the end of execution PATH 1. Similarly, 810 is the end of execution PATH 2, and thus, expression of "Φ" at 810 represents the conditions, in symbolic form, that need to be satisfied in order to reach the end of PATH 2.

Since module "foo" has two possible execution paths, symbolically executing module "foo" results in two sets of expressions, one corresponding to each execution path. In particular embodiments, solving for the expression of "Φ" at 808 may provide the actual values for input variables "a" and "b" that cause module "foo" to reach the end of PATH 1; and solving for the expression of "Φ" at 810 may provide the actual values for input variables "a" and "b" that cause module "foo" to reach the end of PATH 2.

To solve the sets of expressions resulted from performing symbolic execution on the software module, particular embodiments may represent each set of expressions as a set of constraints placed on the variables of the software module, as illustrated in step 704 of FIG. 7. For example, with module "foo", the set of expressions at 808 may be represented as a set of constraints placed on "a", "b", "c", and "d" as "(d=concat (concat(a, b), "t")) && (c=concat(a, b)) && (c !="qrs")". The set of expressions at 810 may be represented as a set of constraints placed on "a", "b", "c", and "d" as "(c=concat(a, b)) && (c="qrs")".

Figure 9A:
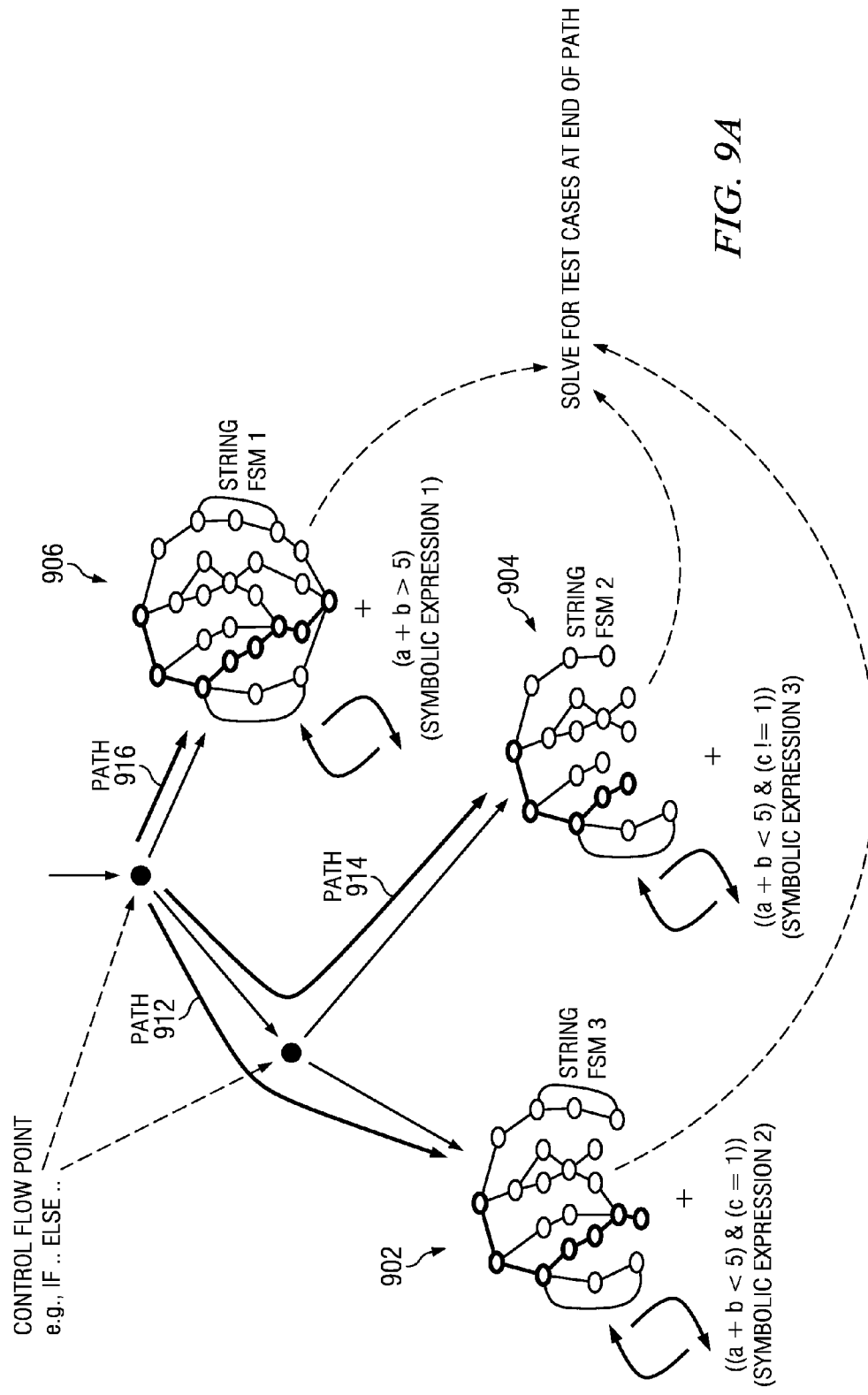
FIGS. 9A-9C illustrate example sets of constraints obtained for an example software module during symbolic execution run and place for generating different application results.

For each set of constraints obtained from performing symbolic execution on the software module, particular embodiments may represent each numeric constraint from the set as an applicable mathematical equation and each string constraint from the set as an application FSM. FIG. 9A illustrate three example sets of constraints 902, 904, 906 determined for an example software module together with the three corresponding execution paths 912, 914, 916 of the software module, where the numeric constraints are represented as mathematical equations and the string constraints are represented as FSMs. To test this example software module, at the end of each path 912, 914, 916, each corresponding set of constraints 902, 904, 906 is solved for the test cases.

Particular embodiments may then attempt to find one or more solutions for each set of constraints, as illustrated in step 706 of FIG. 7, using the process illustrated in FIG. 1, and then test the software module using the solutions found as test input, as illustrated in step 708 of FIG. 7. In particular embodiments, a solution for a set of constraints may include actual values for the variables on which the constraints are placed that satisfy all the constraints in the set. When testing the software module, these actual solution values may be assigned to the variables of the software module as test input. Given a solution found for a set of constraints, since the solution values together satisfy all the constraints from the corresponding set of constraints, and the set of constraints corresponds to a set of expressions (e.g., obtained from the symbolic execution) that represents the state of the software module as it proceeds along and reaches the end of a particular execution path, by applying this specific combination of actual values (i.e., the values from the solution found for the set of constraints) as test input to the software module, it ensures that the software module proceeds along and reaches the end of the particular execution path. Consequently, it means that the particular execution path is fully tested if these specific solution values are assigned to the corresponding variables of the software module as test input. Furthermore, if a solution may be found for each and every set of constraints corresponding to each and every set of expressions obtained for each and every execution path of the software module, and the solution values are applied to the software module as test input (e.g., by applying the actual values of one solution at a time), then all the possible execution paths of the software module may be fully tested. If there is any error in any of the execution paths of the software module, such systematic testing may be able to catch it eventually.

In particular embodiments, a process, such as the one illustrated in FIG. 1, may be used to validate whether design or specification requirements of a software module is satisfied. Typically, there may be formal design or specification requirements associated with any given software module. Some of these formal requirements may be placed on the input or output of the software module. In particular embodiments, a specification requirement placed on the input of a software module may be referred to as a pre-condition associated with the software module; and a specification requirement placed on the output of a software module may be referred to as a post-condition associated with the software module. Sometimes, a post-condition may depend on a pre-condition associated with the software module.

As explained above, often, a software module may include any number of conditional branching points (e.g., the "if-else" statements), and each conditional branching point has a branching condition specified by one or more variables (e.g., input variables or local variables) of the software module. Depending on whether the branching condition is satisfied, the software module may proceed down different execution paths. Thus, when the software module is executed, it may proceed down any one of the possible execution paths resulted from the conditional branching points included in the software module. Consequently, in particular embodiments, when validating whether a software module satisfies the formal specification requirements placed on its input and output (i.e., the pre-conditions and post-conditions associated with the software module), the software module is considered to pass the validation test (i.e., satisfy the specification requirements) if and only if all the pre-conditions and post-conditions associated with the software module hold true for all possible execution paths of the software module.

Figure 10:
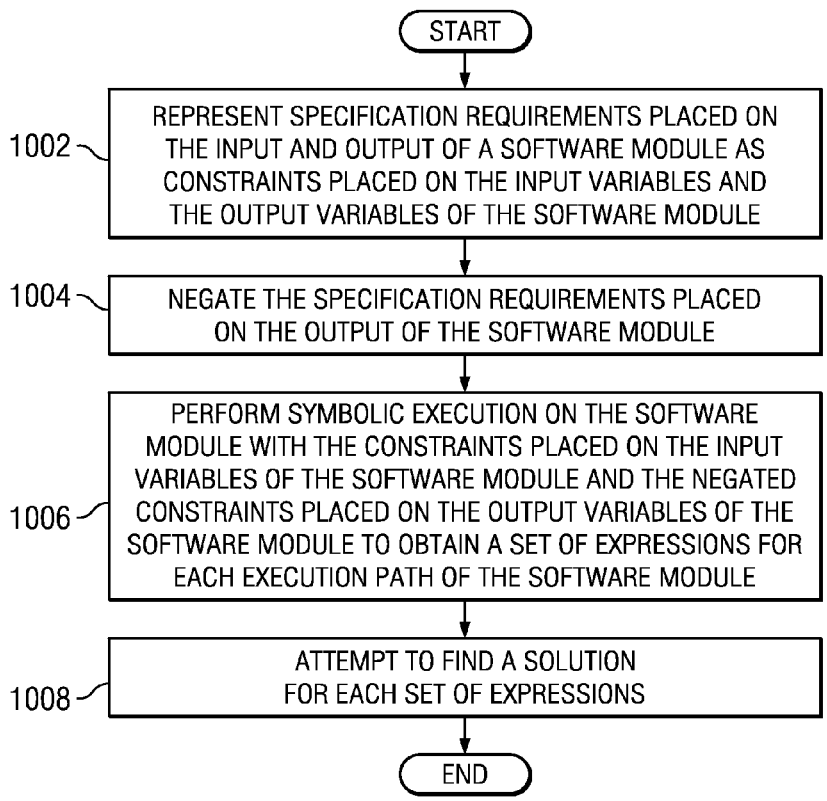
FIG. 10 illustrates an example method for validating a software module in connection with the requirements placed on its input and output.

FIG. 10 illustrates an example method for validating a software module in connection with the requirements (e.g., formal design or specification requirements) placed on the input and output of the software module (i.e., the pre-conditions and the post-conditions associated with the software module). Particular embodiments may represent each pre-condition (e.g., a requirement placed on an input variable) and each post-condition (e.g., a requirement placed on an output variable) of a software module as a constraint placed on the input or output variable of the software module, as illustrated in step 1002 of FIG. 10. For example, consider the example software module "foo", which has two input variables, "a" and "b", of type string. Based on the code of "foo" as illustrated above, it may be determined that "foo" returns one output value of type string. That is, "foo" has one output variable, also of type string. Let "p" represent the output variable of "foo". Suppose the pre-conditions and post-conditions placed on "a", "b", and "p", as specified, for example, by the specification of software module "foo", and expressed as constraints placed on "a", "b", and "p" are:

| SAMPLE CONDITIONS | |
|---|---|
| Pre-condition | IF String p = foo(a, b) and (b.endsWith("s")) |
| Post-condition | THEN p.endsWith("t") |

Particular embodiments may then negate the post-conditions of the software module, as illustrated in step 1004 of FIG. 10. In the above example, software module has one post-condition, "p.endsWith("t")". Logically negating this post-condition results in "!(p.endsWith("t"))".

Particular embodiments may perform symbolic execution on the software module to obtain a set of constraints that corresponds to each possible execution path of the software module and then incorporate the pre-conditions and the negated post-conditions into each set of constraints, as illustrated in step 1006 of FIG. 10. Symbolic execution has be described above in connection with step 702 of FIG. 7, and may be similarly performed here. When determining each set of constraints, particular embodiments may incorporate the numeric and string constraints initially placed on the specific variables of the software module (e.g., as described in connection with step 102 of FIG. 1), if any, as well as the numeric and string constraints inferred for the specific variables of the software module (e.g., as described in connection with step 104 of FIG. 1), if any. For example, software module "foo" has two possible execution paths, as illustrated in FIG. 8. Thus, performing symbolic execution on software module "foo" results in two sets of expressions.

For the first path, PATH 1, the set of expressions obtained from performing symbolic execution on "foo" may be written as "(p=concat(concat(a, b), "t"))) && (concat(a, b) !="qrs")", as indicated by 808 of FIG. 8. Note that "p" has the value of "d" for PATH 1 because "d" is the value that is returned by "foo" (i.e., the output of "foo") at the end of PATH 1, and "w" is the symbolic value assigned to "d". Moreover, "a" is equivalent to "x" because "x" is the symbolic value assigned to "a"; "b" is equivalent to "y"; and "z" is equivalent to "c", which equals "concat(a, b)" according to the source code of "foo". The pre-conditions and the negated post-conditions may then be added to this set of constraints. The final set of constraints for PATH 1 thus becomes "(p=concat(concat(a, b), "t"))) && (concat(a, b) !="qrs") && (b.endsWith("s")) && !(p.endsWith("t"))".

For the second path, PATH 2, the set of expressions obtained from performing symbolic execution on "foo" may be written as "(p=concat(a, b)) && (concat(a, b)="qrs")", as indicated by 810 of FIG. 8. Note that "p" has the value of "c" for PATH 2 because "c" is the value that is returned by "foo" (i.e., the output of "foo") at the end of PATH 2, and "z" is the symbolic value assigned to "c", which equals "concat(a, b)" according to the source code of "foo". The pre-conditions and the negated post-conditions may then be similarly added to this set of constraints as well. The final set of constraints for PATH 2 becomes ""(p=concat(a, b)) && (concat(a, b)="qrs") && (b.endsWith("s")) && !(p.endsWith("t"))".

Particular embodiments may then attempt to find one or more solutions for each set of constraints corresponding to each possible execution path of the software module, as illustrated in step 1008 of FIG. 10, using the process illustrated in FIG. 1. Each set of constraints includes the constraints obtained from performing symbolic execution on the software module as well as the pre-conditions and the negated post-conditions associated with the software module. In particular embodiments, for each set of constraints corresponding to a specific execution path of the software module, if no solution may be found that satisfies all the constraints from the set, then for this execution path, the software module satisfies the requirements placed on its input and output as represented by the pre-conditions and the post-conditions. Recall that each set of constraints includes the negated post-conditions placed on the output of the software module, as explained in steps 1004 and 1006 of FIG. 10. Thus, if no solution may be found for the set of constraints (i.e., the set of constraints is unsatisfiable), and more specifically, if no solution may be found that satisfies the negated post-conditions, then it means that the pre-conditions and the post-conditions hold true for the corresponding execution path. Conversely, if any solution may be found that satisfies all the constraints from the set, then for the corresponding execution path, the software module does not satisfy the requirements placed on its input and output because the pre-conditions and the post-conditions do not hold true for the execution path. Consequently, if any solution may be found for any set of constraints obtained in step 1006 of FIG. 10, then the software module does not pass the validation test in connection with the requirements placed on its input and output. Only when each and every set of constraint obtained at step 1006 of FIG. 10 is unsatisfiable does the software module pass the validation test with respect to the requirements placed on its input and output.

Figure 9B:
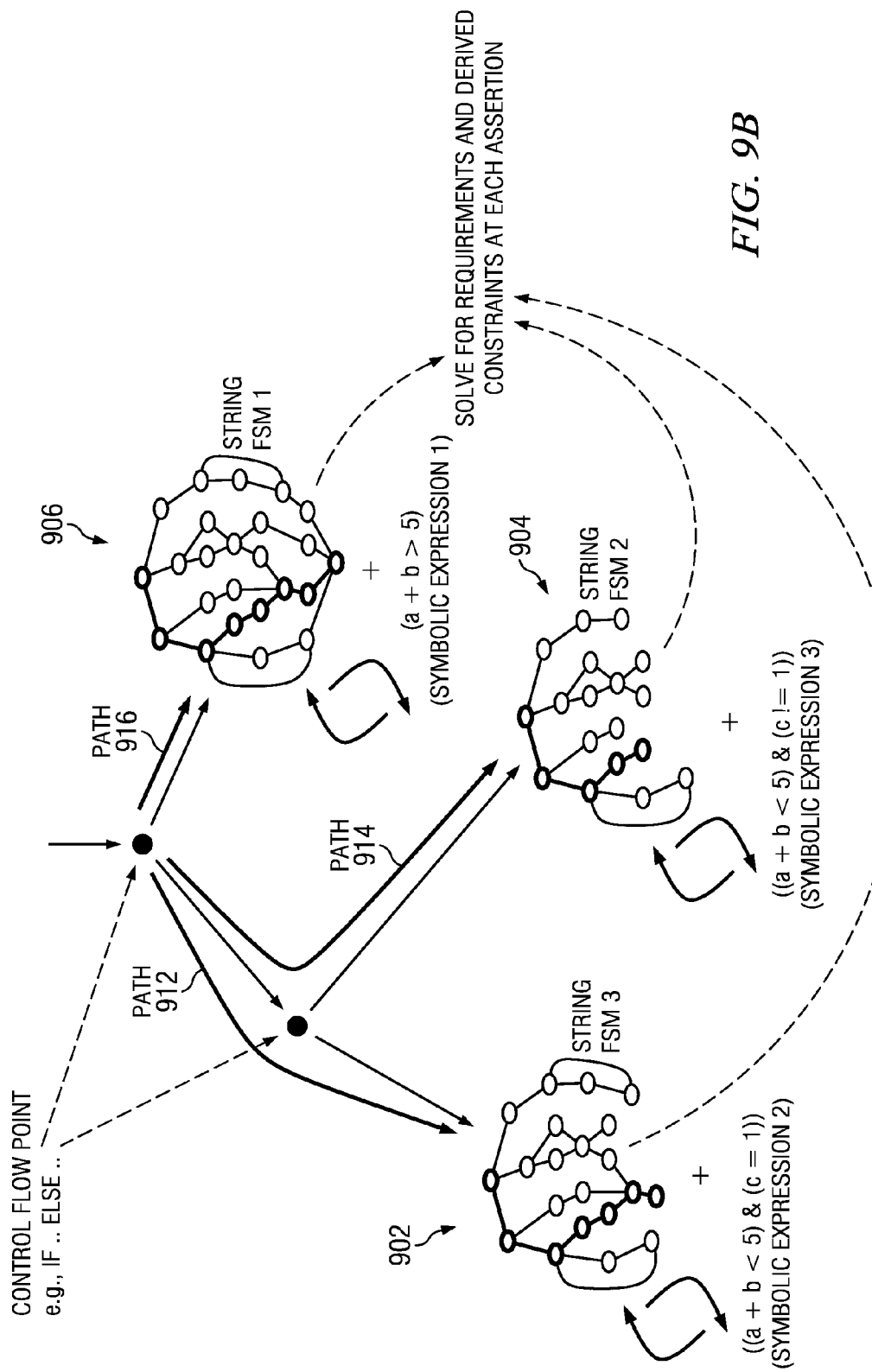

FIG. 9B illustrates again the three example sets of constraints 902, 904, 906 determined for the example software module, as illustrated in FIG. 9A, together with the three corresponding execution paths 912, 914, 916 of the software module. To validate this example software module in connection with the requirements placed on the input and output of the software module, at the end of each path 912, 914, 916, each corresponding set of constraints 902, 904, 906 is solved for the requirements and the assertions.

In particular embodiments, a process, such as the one illustrated in FIG. 1, may be used to validate a software module designed to detect and catch injection attacks. An injection attack, also known as insertion attack, is a form a malicious software attack that often targets SQL databases and other vulnerable websites. In general, a SQL injection is a code injection technique that exploits a security vulnerability occurring in the database layer of a software application. The vulnerability may occur whenever one programming or scripting language is embedded inside another programming or scripting language. More specifically, the vulnerability may be present when user input is either incorrectly filtered for string literal escape characters embedded in SQL statements or user input is not strongly typed and thereby unexpectedly executed. For example, an injection attack may embed the string "shutdown" in anther string (e.g., a random set of characters) as "qk%$d1shutdownsq&^d", and send this string as an input command (e.g., a SQL statement) to a database. If the database software does not catch the "shutdown" string embedded in the seemingly random input string and execute it, the "shutdown" string may cause the database to shut down inadvertently. As a result, most databases have software modules designed to detect and catch such injection attacks. In particular embodiments, the process illustrated in FIG. 1 may be used to verify whether such a security software module is able to detect many different forms of malicious strings that may be embedded in input as injection attacks. For example, one way to test a security software module may be to devise a malicious string or a way to embed a malicious string such that the security software module is unable to detect it (e.g., to fool the security software module into believing that the malicious string is harmless).

Figure 11:
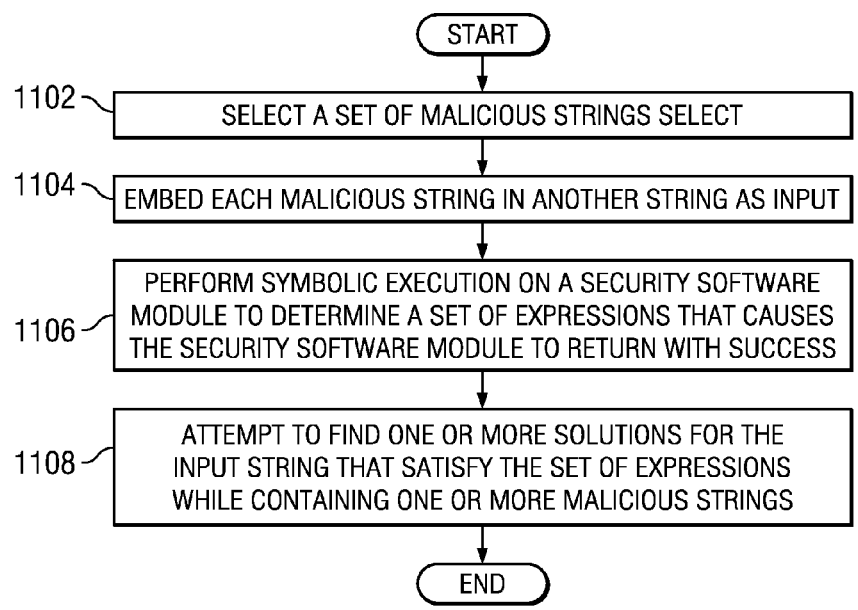
FIG. 11 illustrates an example method for validating a security software module designed to detect injection attacks.

FIG. 11 illustrates an example method for validating a security software module designed to detect injection attacks. In particular embodiments, a security software module may perform various security checks on an input value (e.g., an input string) passed to the security software module to verify whether the input string contains any malicious strings. At each security check point, if the input value passes the security check, the security software module may proceed to the next security check point. Otherwise, the security software module may return with an indication that the input value has failed a particular security check (e.g., return FALSE). Only when the input string has passed all the security checks included in the security software module does the security software module return with an indication that the input value is harmless (e.g., return TRUE).

Particular embodiments may select a set of malicious strings, such as "shutdown", that are likely to be used in connection with injection attacks, as illustrated in step 1102 of FIG. 11. Let "m" represent a specific malicious string. Particular embodiments may then embed each malicious string from the set in another string, represented by "s", as illustrated in step 1104 of FIG. 11. There may be some characters (i.e., a substring) before the malicious string and some characters (i.e., another substring) after the malicious string in "s". Thus, "s" may be represented as "s=concat(concat(x, m), y)", where "x" represents the substring before malicious string "m", and "y" represents the substring after malicious string "m", in "s". Note that either "x" or "y" may be an empty string, and "m" becomes another substring of "s". String "s" may then be applied to a security software module as an input value.

Particular embodiments may perform symbolic execution on the security software module to obtain a set of constraints that, if satisfied, causes the security software module to execute to its end and return with an indication that the input value has passed all the security checks contained therein successfully (e.g., return TRUE), as illustrated in step 1106 of FIG. 11. Symbolic execution has been described above in connection with step 702 of FIG. 7, and may be similarly performed here. When determining the set of constraints, particular embodiments may incorporate the numeric and string constraints initially placed on the specific variables of the software module (e.g., as described in connection with step 102 of FIG. 1), if any, as well as the numeric and string constraints inferred for the specific variables of the software module (e.g., as described in connection with step 104 of FIG. 1), if any. In particular embodiments, the set of constraints, thus obtained, represents all the constraints that need to be satisfied for an input value assigned to the input variable of the security software module to successfully pass all the security checks contained in the security software module so that the software module returns an output value indicating that the input value is harmless.

Particular embodiments may attempt to find one or more solutions for "s", as each malicious string being embedded therein, such that "s" satisfies all the constraints, as illustrated in step 1108 of FIG. 11, using the process illustrated in FIG. 1. If any solution may be found for "s" that satisfies the set of constraints, it means that there is at least one malicious string embedded in "s" that may slip pass all the security checks contained in the security software module. Consequently, the security software module is vulnerable to injection attacks.

Using malicious string "shutdown" as an example. Embedding this string in "s" results in "s=concat(concat(x, "shutdown"), y)". Using the process illustrated in FIG. 1, particular embodiments may attempt to find if there is any solution for "s" providing values for substrings "x" and "y" such that "s", with "shutdown" embedded therein, may satisfy all the constraints from the set of constraints obtained from performing symbolic execution on the security software module. If there is a solution for "x" and "y", it means that there is at least one way to embed malicious string "shutdown" in string "s" having the value "concat(concat(x, "shutdown"), y)" such that string "s" is able to pass all the security checks contained in the security software module successfully (i.e., the security software module fails to detect this specific injection attack embedded with malicious string "shutdown").

In particular embodiments, each malicious string may be represented using different data types when embedded in string "s". For example, the string "shutdown" represented as a hexadecimal number is "0x73687574646f776e". Thus, one possible value for "s" may be "exec shutdown" representing the malicious string in string data type, while another possible value for "s" may be "declare @a char(20) select @a=0x73687574646f776e exec (@a)" representing the malicious string in integer data type. Particular embodiments may attempt to find solutions for "s" where the embedded malicious string is represented using different data types. As a result, not only is the security software module tested with the malicious strings represented in the conventional string data type but is tested with the malicious strings represented in unexpected data types (e.g., represented as integer or float numbers) as well.

Particular embodiments may embed each malicious string "m" from the set of malicious strings in "s" and then attempt to find solutions for "s" providing specific values for "x" and "y" such that "s" as a whole string (i.e., including "x", "m", and "y") satisfies the set of constraints obtained from step 1106 of FIG. 11. If any solution may be found for "s" with any malicious string "m" embedded therein, it means that the security software module is unable to detect the corresponding injection attack and is therefore vulnerable. Moreover, if no solution may be found for "s" with any malicious string "m" embedded therein, particular embodiments may further attempt to find a solution that satisfies the set of constraints obtained from step 1106 of FIG. 11. If any solution may be found, particular embodiments may verify whether the solution itself is in fact a malicious string. This validation on the security software module attempts to determine whether a malicious string, in itself without being embedded in another string, is able to successfully pass all the security checks contained in the security software module (i.e., whether the security software module fails to detect any malicious string).

Figure 9C:
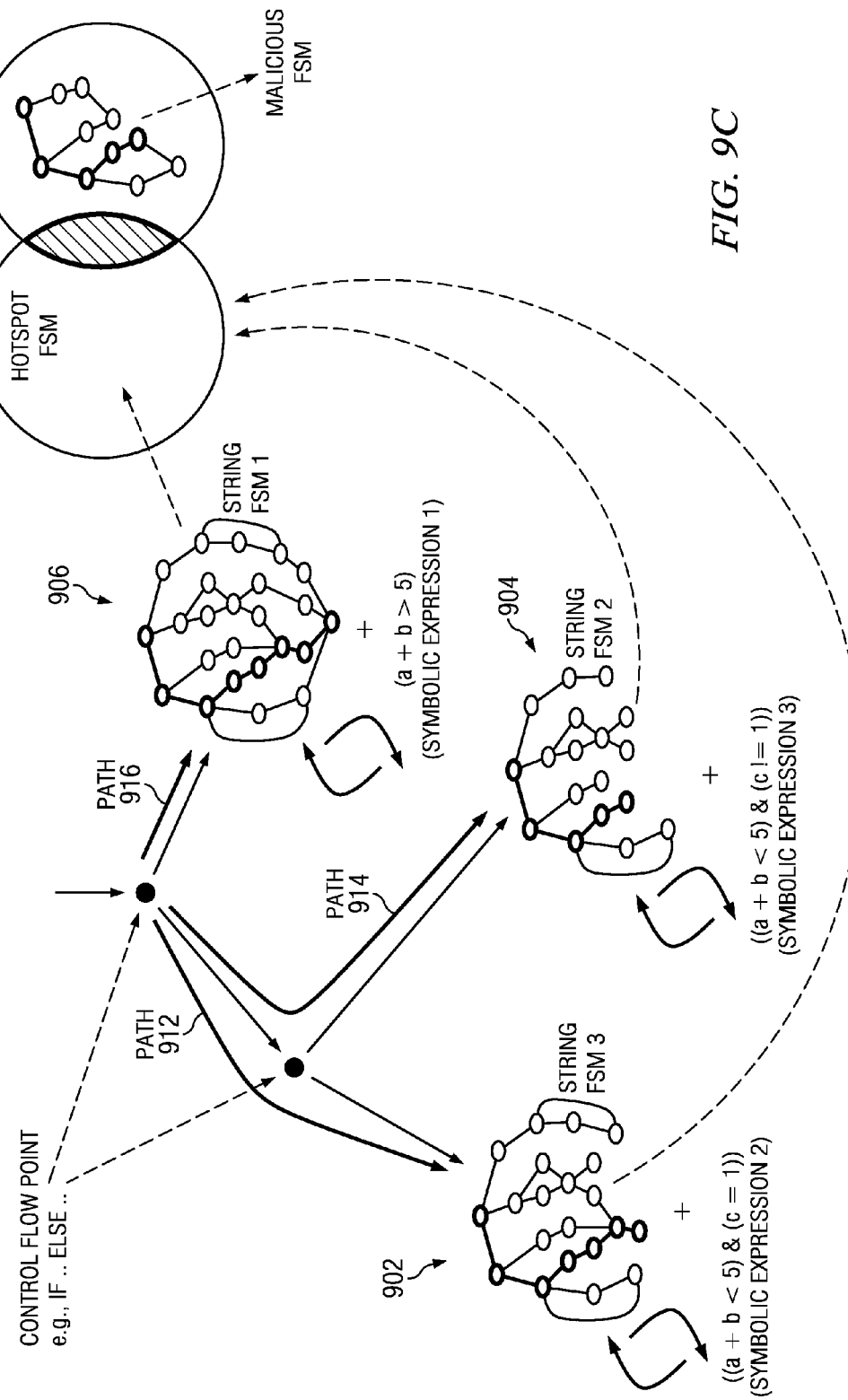

FIG. 9C illustrates again the three example sets of constraints 902, 904, 906 determined for the example software module, as illustrated in FIG. 9A, together with the three corresponding execution paths 912, 914, 916 of the software module. If the example software module is an example security software module, to validate this example security software module, at the end of each path 912, 914, 916, each corresponding set of constraints 902, 904, 906 is solved for the intersection of hotspot FSM representing all the possible strings that passed the internal checks of the software and malicious FSMs. If the intersection is null then no possible injection attacks could be found. A non-null intersection immediately points to a possible injection attack string.

Figure 12:
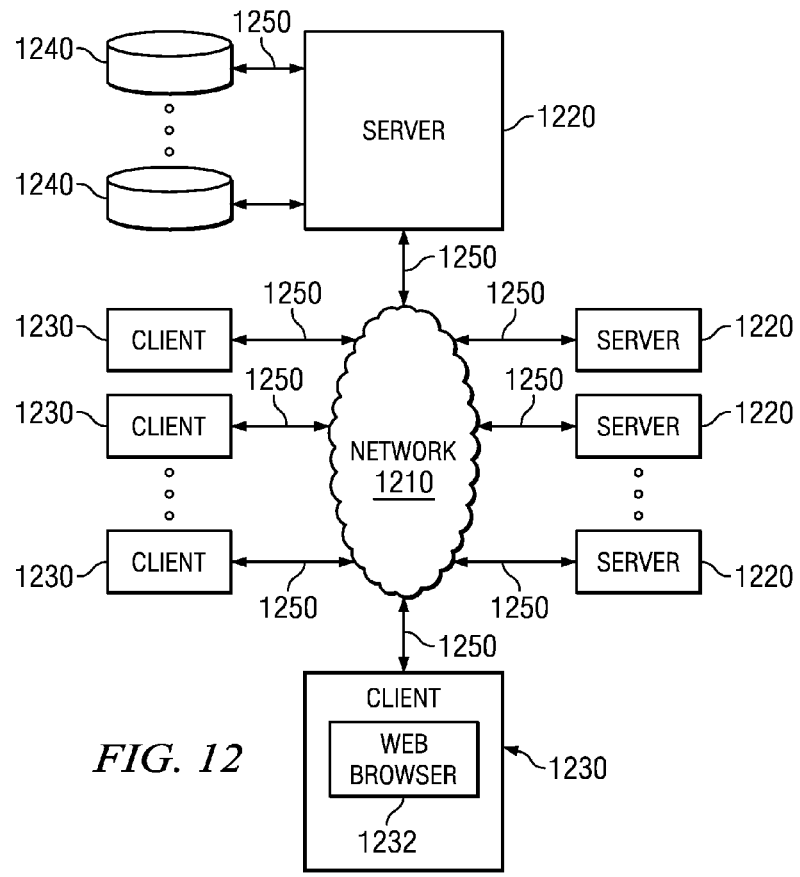
FIG. 12 illustrates an example network environment.

Particular embodiments may be implemented in a network environment. FIG. 12 illustrates an example network environment 1200 suitable for providing software validation as a service. Network environment 1200 includes a network 1210 coupling one or more servers 1220 and one or more clients 1230 to each other. In particular embodiments, network 1210 is an intranet, an extranet, a virtual private network (VPN), a local area network (LAN), a wireless LAN (WLAN), a wide area network (WAN), a metropolitan area network (MAN), a portion of the Internet, or another network 1210 or a combination of two or more such networks 1210. The present disclosure contemplates any suitable network 1210.

One or more links 1250 couple a server 1220 or a client 1230 to network 1210. In particular embodiments, one or more links 1250 each includes one or more wireline, wireless, or optical links 1250. In particular embodiments, one or more links 1250 each includes an intranet, an extranet, a VPN, a LAN, a WLAN, a WAN, a MAN, a portion of the Internet, or another link 1250 or a combination of two or more such links 1250. The present disclosure contemplates any suitable links 1250 coupling servers 1220 and clients 1230 to network 1210.

In particular embodiments, each server 1220 may be a unitary server or may be a distributed server spanning multiple computers or multiple datacenters. Servers 1220 may be of various types, such as, for example and without limitation, web server, news server, mail server, message server, advertising server, file server, application server, exchange server, database server, or proxy server. In particular embodiments, each server 1220 may include hardware, software, or embedded logic components or a combination of two or more such components for carrying out the appropriate functionalities implemented or supported by server 1220. For example, a web server is generally capable of hosting websites containing web pages or particular elements of web pages. More specifically, a web server may host HTML files or other file types, or may dynamically create or constitute files upon a request, and communicate them to clients 1230 in response to HTTP or other requests from clients 1230. A mail server is generally capable of providing electronic mail services to various clients 1230. A database server is generally capable of providing an interface for managing data stored in one or more data stores.

In particular embodiments, one or more data storages 1240 may be communicatively linked to one or more severs 1220 via one or more links 1250. In particular embodiments, data storages 1240 may be used to store various types of information. In particular embodiments, the information stored in data storages 1240 may be organized according to specific data structures. In particular embodiment, each data storage 1240 may be a relational database. Particular embodiments may provide interfaces that enable servers 1220 or clients 1230 to manage, e.g., retrieve, modify, add, or delete, the information stored in data storage 1240.

In particular embodiments, each client 1230 may be an electronic device including hardware, software, or embedded logic components or a combination of two or more such components and capable of carrying out the appropriate functionalities implemented or supported by client 1230. For example and without limitation, a client 1230 may be a desktop computer system, a notebook computer system, a netbook computer system, a handheld electronic device, or a mobile telephone. The present disclosure contemplates any suitable clients 1230. A client 1230 may enable a network user at client 1230 to access network 1230. A client 1230 may enable its user to communicate with other users at other clients 1230.

A client 1230 may have a web browser 1232, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 1230 may enter a Uniform Resource Locator (URL) or other address directing the web browser 1232 to a server 1220, and the web browser 1232 may generate a Hyper Text Transfer Protocol (HTTP) request and communicate the HTTP request to server 1220. Server 1220 may accept the HTTP request and communicate to client 1230 one or more Hyper Text Markup Language (HTML) files responsive to the HTTP request. Client 1230 may render a web page based on the HTML files from server 1220 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 13:
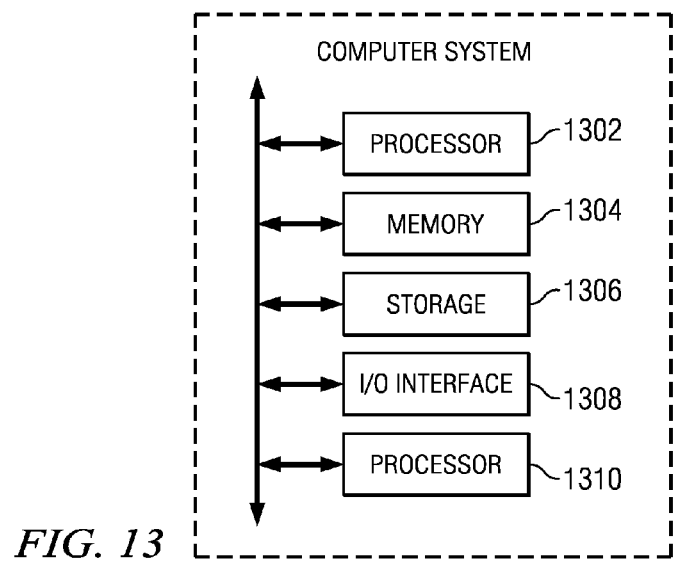
FIG. 13 illustrates an example computer system.

Particular embodiments may be implemented on one or more computer systems. FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1300 may include one or more computer systems 1300; be unitary or distributed; span multiple locations; span multiple machines; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. The present disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. The present disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include an HDD, a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 1302 (such as, for example, one or more internal registers or caches), one or more portions of memory 1304, one or more portions of storage 1306, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, by one or more computing devices:
   analyzing one or more first numeric constraints and one or more first string constraints associated with a software module, wherein:
   the software module comprises:
   one or more numeric variables;
   one or more string variables;
   one or more first operations that apply to specific ones of the numeric variables and produce numeric or string results; and one or more second operations that apply to specific ones of the string variables and produce numeric or string results;

the first numeric constraints apply to specific ones of the numeric variables; and the first string constraints apply to specific ones of the string variables;

inferring one or more second numeric constraints applying to specific ones of the string variables;

inferring one or more second string constraints applying to specific ones of the numeric variables;

representing each one of the first and second numeric constraints with an equation;

representing each one of the first and second string constraints with a finite state machine; and validating the software module with respect to one or more requirements associated with the software module by attempting to solve for a solution comprising one or more values for specific ones of the numeric and string variables that satisfies all the first and second numeric constraints, all the first and second string constraints, and all the requirements, wherein attempting to solve for the solution that satisfies all the first and second numeric constraints, all the first and second string constraints, and all the requirements comprises:

iteratively trying different possible values for the numeric and string variables and testing whether the possible values together produce a solution that satisfies all of the first and second numeric constraints, the first and second string constraints, and the requirements until a solution is found, the first and second numeric and string constraints are determined to be unsatisfiable, or a number of the iterations reaches a threshold; and if a solution is found, then outputting the values for the numeric and string variables.

2. The method of claim 1, wherein:

the numeric variables comprises one or more input numeric variables and one or more intermediate numeric variables;

the string variables comprises one or more input string variables and one or more intermediate strings variables;

the first numeric constraints applied to specific ones of the input numeric variables and the first string constraints applied to specific ones of the input string variables are determined based on a specification of the software module; and the first numeric constraints applied to specific ones of the intermediate numeric variables and the first string constraints applied to specific ones of the intermediate string variables are determined by performing symbolic execution on the software module.

3. The method of claim 1, wherein:

the second numeric constraints are inferred based on the first string constraints and the second operations; and the second string constraints are inferred based on the first numeric constraints and the first operations.

4. The method of claim 3, wherein the second numeric and string constraints are inferred further based on a specification of a programming language implementing the software module and a runtime environment within which the software module is executed.

5. The method of claim 1, wherein:

the software module further comprises one or more conditional branching points and one or more execution paths resulted from the conditional branching points;

each one of the branching points is associated with a branching condition specified by one or more of the numeric or string variables; and during execution of the software module, at each one of the conditional branching points, the software module proceeds down different ones of the execution paths depending on whether the branching condition associated with the conditional branching point is satisfied.

6. The method of claim 5, wherein:

the numeric or string variables of the software module comprise one or more input variables and one or more output variables of the software module;

the requirements associated with the software module comprise one or more input requirements applied to specific ones of the input variables of the software module, and one or more output requirements applied to specific ones of the output variables of the software module; and validating the software module with respect to the requirements associated with the software module comprises:

determining one or more sets of constraints applied to specific ones of the numeric or string variables of the software module, wherein each set of constraints corresponds to a specific one of the execution paths of the software module, and if satisfied, causes the software module to reach an end of the corresponding execution path;

representing each one of the input requirements as a pre-condition constraint to obtain one or more pre-condition constraints;

representing each one of the output requirements as a post-condition constraint to obtain one or more post-condition constraints;

negating each one of the post-condition constraints;

incorporating the pre-condition constraints and the negated post-condition constraints in each set of constraints;

attempting to find one or more solutions that satisfy each set of constraints; and if any solution is found for any set of constraints, then indicating that the software module does not satisfy all the input and output requirements.

7. The method of claim 6, wherein each set of constraints is determined based on the first and second numeric constraints and the first and second string constraints.

8. The method of claim 6, wherein validating the software module with respect to the requirements associated with the software module further comprises performing symbolic execution on the software module to obtain the sets of constraints.

9. A system comprising:

a memory comprising instructions executable by one or more processors; and one or more processors coupled to the memory and operable to execute the instructions, the one or more processors being operable when executing the instructions to:

analyze one or more first numeric constraints and one or more first string constraints associated with a software module, wherein:

the software module comprises:

one or more numeric variables;

one or more string variables;

one or more first operations that apply to specific ones of the numeric variables and produce numeric or string results; and one or more second operations that apply to specific ones of the string variables and produce numeric or string results;

the first numeric constraints apply to specific ones of the numeric variables; and the first string constraints apply to specific ones of the string variables;

infer one or more second numeric constraints applying to specific ones of the string variables;

infer one or more second string constraints applying to specific ones of the numeric variables;

represent each one of the first and second numeric constraints with an equation;

represent each one of the first and second string constraints with a finite state machine; and validate the software module with respect to one or more requirements associated with the software module by attempting to solve for a solution comprising one or more values for specific ones of the numeric and string variables that satisfies all the first and second numeric constraints, all the first and second string constraints, and all the requirements, wherein attempt to solve for the solution that satisfies all the first and second numeric constraints, all the first and second string constraints, and all the requirements comprises:

iteratively try different possible values for the numeric and string variables and test whether the possible values together produce a solution that satisfies all of the first and second numeric constraints, the first and second string constraints, and the requirements until a solution is found, the first and second numeric and string constraints are determined to be unsatisfiable, or a number of the iterations reaches a threshold; and if a solution is found, then output the values for the numeric and string variables.

10. The system of claim 9, wherein:

the numeric variables comprises one or more input numeric variables and one or more intermediate numeric variables;

the string variables comprises one or more input string variables and one or more intermediate strings variables;

the first numeric constraints applied to specific ones of the input numeric variables and the first string constraints applied to specific ones of the input string variables are determined based on a specification of the software module; and the first numeric constraints applied to specific ones of the intermediate numeric variables and the first string constraints applied to specific ones of the intermediate string variables are determined by performing symbolic execution on the software module.

11. The system of claim 9, wherein:

the second numeric constraints are inferred based on the first string constraints and the second operations; and the second string constraints are inferred based on the first numeric constraints and the first operations.

12. The system of claim 11, wherein the second numeric and string constraints are inferred further based on a specification of a programming language implementing the software module and a runtime environment within which the software module is executed.

13. The system of claim 9, wherein:

the software module further comprises one or more conditional branching points and one or more execution paths resulted from the conditional branching points;

each one of the branching points is associated with a branching condition specified by one or more of the numeric or string variables; and during execution of the software module, at each one of the conditional branching points, the software module proceeds down different ones of the execution paths depending on whether the branching condition associated with the conditional branching point is satisfied.

14. The system of claim 13, wherein:

the numeric or string variables of the software module comprise one or more input variables and one or more output variables of the software module;

the requirements associated with the software module comprise one or more input requirements applied to specific ones of the input variables of the software module, and one or more output requirements applied to specific ones of the output variables of the software module; and validate the software module with respect to the requirements associated with the software module comprises:

determine one or more sets of constraints applied to specific ones of the numeric or string variables of the software module, wherein each set of constraints corresponds to a specific one of the execution paths of the software module, and if satisfied, causes the software module to reach an end of the corresponding execution path;

represent each one of the input requirements as a pre-condition constraint to obtain one or more pre-condition constraints;

represent each one of the output requirements as a post-condition constraint to obtain one or more post-condition constraints;

negate each one of the post-condition constraints;

incorporate the pre-condition constraints and the negated post-condition constraints in each set of constraints;

attempt to find one or more solutions that satisfy each set of constraints; and if any solution is found for any set of constraints, then indicate that the software module does not satisfy all the input and output requirements.

15. The system of claim 14, wherein each set of constraints is determined based on the first and second numeric constraints and the first and second string constraints.

16. The system of claim 14, wherein validate the software module with respect to the requirements associated with the software module further comprises perform symbolic execution on the software module to obtain the sets of constraints.

17. A computer-readable non-transitory storage media embodying software operable when executed by one or more computing devices to:

analyze one or more first numeric constraints and one or more first string constraints associated with a software module, wherein:

the software module comprises:

one or more numeric variables;

one or more string variables;

one or more first operations that apply to specific ones of the numeric variables and produce numeric or string results; and one or more second operations that apply to specific ones of the string variables and produce numeric or string results;

the first numeric constraints apply to specific ones of the numeric variables; and the first string constraints apply to specific ones of the string variables;

infer one or more second numeric constraints applying to specific ones of the string variables;

infer one or more second string constraints applying to specific ones of the numeric variables;

represent each one of the first and second numeric constraints with an equation;

represent each one of the first and second string constraints with a finite state machine; and validate the software module with respect to one or more requirements associated with the software module by attempting to solve for a solution comprising one or more values for specific ones of the numeric and string variables that satisfies all the first and second numeric constraints, all the first and second string constraints, and all the requirements, wherein attempt to solve for the solution that satisfies all the first and second numeric constraints, all the first and second string constraints, and all the requirements comprises:

iteratively try different possible values for the numeric and string variables and test whether the possible values together produce a solution that satisfies all of the first and second numeric constraints, the first and second string constraints, and the requirements until a solution is found, the first and second numeric and string constraints are determined to be unsatisfiable, or a number of the iterations reaches a threshold; and if a solution is found, then output the values for the numeric and string variables.

18. The media of claim 17, wherein:

the numeric variables comprises one or more input numeric variables and one or more intermediate numeric variables;

the string variables comprises one or more input string variables and one or more intermediate strings variables;

the first numeric constraints applied to specific ones of the input numeric variables and the first string constraints applied to specific ones of the input string variables are determined based on a specification of the software module; and the first numeric constraints applied to specific ones of the intermediate numeric variables and the first string constraints applied to specific ones of the intermediate string variables are determined by performing symbolic execution on the software module.

19. The media of claim 17, wherein:

the second numeric constraints are inferred based on the first string constraints and the second operations; and the second string constraints are inferred based on the first numeric constraints and the first operations.

20. The media of claim 19, wherein the second numeric and string constraints are inferred further based on a specification of a programming language implementing the software module and a runtime environment within which the software module is executed.

21. The media of claim 17, wherein:

the software module further comprises one or more conditional branching points and one or more execution paths resulted from the conditional branching points;

each one of the branching points is associated with a branching condition specified by one or more of the numeric or string variables; and during execution of the software module, at each one of the conditional branching points, the software module proceeds down different ones of the execution paths depending on whether the branching condition associated with the conditional branching point is satisfied.

22. The media of claim 21, wherein:

the numeric or string variables of the software module comprise one or more input variables and one or more output variables of the software module;

the requirements associated with the software module comprise one or more input requirements applied to specific ones of the input variables of the software module, and one or more output requirements applied to specific ones of the output variables of the software module; and validate the software module with respect to the requirements associated with the software module comprises:

determine one or more sets of constraints applied to specific ones of the numeric or string variables of the software module, wherein each set of constraints corresponds to a specific one of the execution paths of the software module, and if satisfied, causes the software module to reach an end of the corresponding execution path;

represent each one of the input requirements as a pre-condition constraint to obtain one or more pre-condition constraints;

represent each one of the output requirements as a post-condition constraint to obtain one or more post-condition constraints;

negate each one of the post-condition constraints;

incorporate the pre-condition constraints and the negated post-condition constraints in each set of constraints;

attempt to find one or more solutions that satisfy each set of constraints; and if any solution is found for any set of constraints, then indicate that the software module does not satisfy all the input and output requirements.

23. The media of claim 22, wherein each set of constraints is determined based on the first and second numeric constraints and the first and second string constraints.

24. The media of claim 22, wherein validate the software module with respect to the requirements associated with the software module further comprises perform symbolic execution on the software module to obtain the sets of constraints.

25. A system comprising:

means for analyzing one or more first numeric constraints and one or more first string constraints associated with a software module, wherein:

the software module comprises:

one or more numeric variables;

one or more string variables;

one or more first operations that apply to specific ones of the numeric variables and produce numeric or string results; and one or more second operations that apply to specific ones of the string variables and produce numeric or string results;

the first numeric constraints apply to specific ones of the numeric variables; and the first string constraints apply to specific ones of the string variables;

means for inferring one or more second numeric constraints applying to specific ones of the string variables;

means for inferring one or more second string constraints applying to specific ones of the numeric variables;

means for representing each one of the first and second numeric constraints with an equation;

means for representing each one of the first and second string constraints with a finite state machine; and means for validating the software module with respect to one or more requirements associated with the software module by attempting to solve for a solution comprising one or more values for specific ones of the numeric and string variables that satisfies all the first and second numeric constraints, all the first and second string constraints, and all the requirements, wherein attempting to solve for the solution that satisfies all the first and second numeric constraints, all the first and second string constraints, and all the requirements comprises:

means for iteratively trying different possible values for the numeric and string variables and testing whether the possible values together produce a solution that satisfies all of the first and second numeric constraints, the first and second string constraints, and the requirements until a solution is found, the first and second numeric and string constraints are determined to be unsatisfiable, or a number of the iterations reaches a threshold; and if a solution is found, then means for outputting the values for the numeric and string variables.

* * * * *